United States Patent
Shao et al.

(10) Patent No.: US 10,657,212 B2
(45) Date of Patent: May 19, 2020

(54) APPLICATION- OR ALGORITHM-SPECIFIC QUANTUM CIRCUIT DESIGN

(71) Applicant: International Business Machines Corporation, Armonk, NY (US)

(72) Inventors: Dongbing Shao, Wappingers Falls, NY (US); Martin O. Sandberg, Ossining, NY (US); Markus Brink, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/134,673

(22) Filed: Sep. 18, 2018

(65) Prior Publication Data

US 2020/0089832 A1 Mar. 19, 2020

(51) Int. Cl.
*G06F 17/50* (2006.01)
*G06N 10/00* (2019.01)

(52) U.S. Cl.
CPC ......... *G06F 17/5045* (2013.01); *G06N 10/00* (2019.01); *G06F 2217/02* (2013.01); *G06F 2217/06* (2013.01)

(58) Field of Classification Search
CPC ............. G06F 17/5045; G06F 2217/06; G06F 2217/02; G06N 10/00
See application file for complete search history.

(56) References Cited

U.S. PATENT DOCUMENTS 7,613,764 B1 * 11/2009 Hilton .................... G06N 10/00
708/801
8,631,367 B2 1/2014 Pesetski et al.
(Continued)

FOREIGN PATENT DOCUMENTS

WO 2016081788 5/2016
WO 2017053986 3/2017

OTHER PUBLICATIONS

Rotta et al., "Quantum information density scaling and qubit operation time constraints of CMOS silicon based quantum computer architectures," https://arxiv.org/pdf/1704.06365.pdf, 56 pages.
(Continued)

*Primary Examiner* — Stacy Whitmore
(74) *Attorney, Agent, or Firm* — Amin, Turocy & Watson, LLP

(57) ABSTRACT

Techniques for designing application or algorithm specific quantum computing circuits for particular applications or algorithms are presented. A design component can comprise an extractor component that can extract qubit pairs determined to satisfy a defined threshold potential of having to use a direct connection between each other in a quantum circuit design based on analysis of an application or algorithm; and a design management component (DMC) that can determine a circuit design of the quantum circuit to use for the application or algorithm based on analysis of characteristics associated with the qubit pairs. DMC can sort the qubit pairs by weighting schemes and the characteristics, comprising the number of affecting downstream qubits, the number of two-qubit gate operations between qubit pairs, and/or whether a qubit pair affects a measurement. Based on the sorting, DMC selects highest ranking qubit pairs to assign a direct connection.

25 Claims, 10 Drawing Sheets

(56) References Cited

U.S. PATENT DOCUMENTS

| | | | | |
|---|---|---|---|---|
| 9,710,758 | B2* | 7/2017 | Bunyk | G06N 10/00 |
| 9,779,359 | B2 | 10/2017 | Svore et al. | |
| 2002/0180006 | A1* | 12/2002 | Franz | B82Y 10/00 |
| | | | | 257/661 |
| 2004/0170047 | A1* | 9/2004 | Amin | B82Y 10/00 |
| | | | | 365/145 |
| 2011/0031994 | A1* | 2/2011 | Berkley | G06N 10/00 |
| | | | | 326/3 |
| 2014/0280404 | A1* | 9/2014 | Svore | G06N 10/00 |
| | | | | 708/200 |
| 2016/0012347 | A1* | 1/2016 | King | G06F 15/76 |
| | | | | 712/42 |
| 2017/0228483 | A1 | 8/2017 | Rigetti et al. | |
| 2017/0316336 | A1 | 11/2017 | Bocharov et al. | |
| 2018/0039903 | A1 | 2/2018 | Mosca et al. | |
| 2018/0046933 | A1 | 2/2018 | La Cour et al. | |
| 2018/0052806 | A1 | 2/2018 | Hastings et al. | |
| 2018/0276555 | A1* | 9/2018 | Weichenberger | G06N 10/00 |
| 2019/0042974 | A1* | 2/2019 | Daraeizadeh | G06T 15/005 |
| 2019/0044542 | A1* | 2/2019 | Hogaboam | G06N 10/00 |
| 2019/0236218 | A1* | 8/2019 | Paik | G06F 17/5036 |

OTHER PUBLICATIONS

Linke et al., "Experimental comparison of two quantum computing architectures," PNAS, vol. 114, No. 13, Mar. 28, 2017, 6 pages.

International Search Report and Written Opinion for International Application No. PCT/EP2019/073003 dated Dec. 4, 2019, 15 pages.

Shafaei Alireza et al: "Qubit placement to minimize communication overhead in 2D quantum architectures", 2014 19th Asia and South Pacific Design Automation Conference (ASP-DAC), IEEE, Jan. 20, 2014 (Jan. 20, 2014), pp. 495-500, XP032570107, DOI: 10.1109/ASPDAC2014.6742940 [retrieved on Feb. 18, 2014], abstract, figures 4, 5, sections 4 and 6.

Pedram Massoud et al: "Layout Optimization for Quantum Circuits with Linear Nearest Neighbor Architectures", IEEE Circuits and Systems Magazine, vol. 16, No. 2, May 24, 2016 (May 24, 2016),—May 24, 2016 (May 24, 2016), pp. 62-74, XP011612122, ISSN: 1531-636X, DOI: 10.1109/MCAS.20162549950 [retrieved on May 23, 2016] abstract, sections IV and V.

\* cited by examiner

APPLICATION- OR ALGORITHM-SPECIFIC QUANTUM CIRCUIT DESIGN

BACKGROUND

The subject disclosure relates to quantum circuits, e.g., quantum circuit design. Quantum computing employs quantum physics to encode and process information rather than binary digital techniques based on transistors. A quantum computing device employs quantum bits (also referred to as qubits) that operate according to the laws of quantum physics and can exhibit phenomena such as superposition and entanglement. The superposition principle of quantum physics allows qubits to be in a state that partially represent both a value of "1" and a value of "O" at the same time. The entanglement principle of quantum physics allows qubits to be correlated with each other such that the combined states of the qubits cannot be factored into individual qubit states. For instance, a state of a first qubit can depend on a state of a second qubit. As such, a quantum circuit can employ qubits to encode and process information in a manner that can be significantly different from binary digital techniques based on transistors. However, the designing of quantum circuits often can be relatively difficult and/or time consuming.

With regard to quantum circuit design, a conventional approach can be to employ a universal quantum computing circuit that can be utilized, with varying and/or limited levels of performance, for virtually all types of algorithms. A universal quantum computing circuit design can be utilized for an algorithm to create a superconducting quantum computing circuit to perform superconducting quantum circuit operations. A universal quantum computing circuit typically can have qubits that can be connected to all of their neighbor qubits, and typically can run all or virtually all types of algorithms, although with varying and/or limited levels of performance, due at least in part to, for example, resource limits and design constraints, as well as the universal nature of the connectivity of the qubits in the universal quantum computing circuit. With regard to universal quantum computing circuits, for operations on qubits that have no direct connection, multiple swap gates typically can be used. However, there can be a number of problems with using universal quantum computing circuits for algorithms, particularly with regard to using universal quantum computing circuits on non-ideal quantum processors. Certain quantum processors can be considered non-ideal, for example, because they can comprise non-ideal qubits (e.g., short coherence times) and/or non-ideal gates (e.g., gate errors). Due to these and/or other non-idealities, there can be a limit on the number of gate operations that can be employed while still obtaining reasonable fidelity of the final outcome. These types of circuits are often referred to as shallow. Universal quantum computing circuits can have a general connectivity onto which any algorithm, in principle, can be implemented. However, there can be an undesirable and/or unduly higher accumulative error rate when using a universal quantum computing circuit for an algorithm, due in part to the relatively higher number of gate operations used, as gate fidelity is not 100%. These and other deficiencies of conventional quantum computing circuit designs, such as universal quantum computing circuits, can result in inefficient and/or ineffective circuits and/or inefficient performance of a quantum circuit design.

SUMMARY

The following presents a summary to provide a basic understanding of one or more embodiments of the disclosed subject matter. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, structures, computer-implemented methods, apparatuses, and/or computer program products that can facilitate determination of a circuit design of a quantum circuit to use for an application based on an analysis of characteristics associated with the pairs of qubits.

According to an embodiment, a system comprising a memory that stores computer-executable components; and a processor, operatively coupled to the memory, that executes computer-executable components. The computer-executable components can comprise an extractor component that extracts pairs of qubits that are determined to satisfy a defined threshold potential of having to use a direct connection between each other based on an analysis of an application. The computer-executable components also can include a design management component that determines a circuit design of a quantum circuit to use for the application based on an analysis of characteristics associated with the pairs of qubits. The system can have a number of advantages, including that the system can enhance performance of the quantum circuit and the application or associated algorithm when running the application or algorithm using the quantum circuit.

In some embodiments, the design management component can analyze the characteristics associated with the pairs of qubits, and can sort the pairs of qubits based on the characteristics associated with the pairs of qubits and weight values associated with the characteristics. In certain embodiments, the design management component can determine a subset of the pairs of qubits that have a higher ranking than other pairs of qubits of the pairs of qubits based on the sorting, and can assign direct connections to the pairs of qubits of the subset of the pairs of qubits based on a defined circuit design criterion that can indicate a maximum number of pairs of qubits that are permitted to have a direct connection. These embodiments of the system can provide a number of advantages, including that the system can reduce the number of gates utilized in a quantum circuit to run the application or associated algorithm, and reduce connectivity utilized in a quantum circuit to run the application or associated algorithm.

Another embodiment relates to a computer-implemented method that comprises extracting, by a system operatively coupled to a processor, pairs of qubits that are determined to satisfy a defined threshold potential of having to utilize a direct connection between each other based on analyzing an application. The computer-implemented method also comprises determining, by the system, a circuit design of a quantum circuit to use for the application based on analyzing characteristics of the pairs of qubits. The computer-implemented method can have a number of advantages, including that the method can enhance performance of the quantum circuit and the application or associated algorithm when running the application or associated algorithm using the quantum circuit.

In certain embodiments, the computer-implemented method also can comprise analyzing, by the system, the characteristics associated with the pairs of qubits; and sorting, by the system, the pairs of qubits based on the characteristics associated with the pairs of qubits and weight values associated with the characteristics. In other embodiments, the computer-implemented method can comprise determining, by the system, a subset of the pairs of qubits that have a higher ranking than other pairs of qubits of the pairs of qubits based on the sorting of the pairs of qubits; and assigning direct connections to pairs of qubits of the subset of the pairs of qubits, wherein a maximum number of pairs of qubits that is able to be in the subset of the pairs of qubits is determined based on a defined circuit design criterion. Such embodiments of the method can provide a number of advantages, including that the method can reduce the number of gates utilized in a quantum circuit to run the application or associated algorithm, and reduce connectivity utilized in a quantum circuit to run the application or algorithm.

A further embodiment relates to a computer program product that facilitates determining a circuit design of a quantum circuit, the computer program product comprising a computer readable storage medium having program instructions embodied therewith. The program instructions are executable by a processor to cause the processor to extract pairs of qubits that are determined to satisfy a defined threshold potential of having to use a direct connection between each other based on an analysis of an application. The program instructions also are executable by the processor to determine the circuit design of the quantum circuit to use for the application based on an analysis of characteristics of the pairs of qubits. The computer program product can have a number of advantages, including that the computer program product can enhance performance of the quantum circuit and the application or associated algorithm when running the application or associated algorithm using the quantum circuit.

In some embodiments, the program instructions can be executable by the processor to cause the processor to: analyze the characteristics associated with the pairs of qubits; and sort the pairs of qubits based on the characteristics associated with the pairs of qubits and weight values associated with the characteristics, wherein the characteristics can be selected from a group of characteristics consisting of a number of affecting downstream qubits associated with a pair of qubits of the pairs of qubits, a number of two-qubit gate operations between the pair of qubits, a measurement that is affected by the pair of qubits, and no measurement being determined to be affected by the pair of qubits. These embodiments of the computer program product can provide a number of advantages, including that the computer program product can reduce the number of gates utilized in a quantum circuit to run the application or associated algorithm, and reduce connectivity utilized in a quantum circuit to run the application or algorithm.

According to still another embodiment, a system comprising a memory that stores computer-executable components; and a processor, operatively coupled to the memory, that executes computer-executable components. The computer-executable components can comprise an extractor component that extracts pairs of qubits that are determined to meet a defined threshold potential for use of a direct connection between each other based on an analysis of an algorithm associated with an application. The computer-executable components also can include a design management component that determines a quantum computing circuit design to use for the algorithm based on an analysis of characteristics associated with the pairs of qubits and based on weights associated with the characteristics. The system can have a number of advantages, including that the system can enhance the performance of the quantum computing circuit design and the algorithm when running the algorithm using the quantum computing circuit design.

In certain embodiments, the design management component can analyze the characteristics associated with the pairs of qubits, and can rank the pairs of qubits based on the characteristics associated with the pairs of qubits and based on the weights associated with the characteristics. In other embodiments, the design management component can determine a subset of the pairs of qubits that have a higher ranking than other pairs of qubits of the pairs of qubits based on the ranking, and can assign direct connections to the pairs of qubits of the subset of the pairs of qubits based on a defined circuit design criterion that can indicate a defined number of pairs of qubits that are able to have a direct connection. Such embodiments of the system can provide a number of advantages, including that the system can reduce the number of gates utilized in a quantum circuit to run the algorithm and reduce connectivity utilized in a quantum circuit to run the algorithm.

Yet another embodiment relates to a computer program product that facilitates determining a quantum computing circuit design, the computer program product comprising a computer readable storage medium having program instructions embodied therewith. The program instructions are executable by a processor to cause the processor to extract pairs of qubits that are determined to meet a defined threshold potential for use of a direct connection between each other based on an analysis of an algorithm associated with an application. The program instructions also are executable by the processor to determine the quantum computing circuit design to use for the algorithm based on an analysis of characteristics associated with the pairs of qubits and based on weights associated with the characteristics. The computer program product can have a number of advantages, including that the computer program product can enhance performance of the quantum computing circuit design and the application or associated algorithm when running the application or associated algorithm using the quantum computing circuit design.

In some example embodiments, the program instructions can be executable by the processor to cause the processor to analyze the characteristics associated with the pairs of qubits; and rank the pairs of qubits based on results of the analysis of the characteristics associated with the pairs of qubits and based on the weight values associated with the characteristics, wherein the characteristics can be selected from a group of characteristics consisting of a number of affecting downstream qubits associated with a pair of qubits of the pairs of qubits, a number of two-qubit gate operations between the pair of qubits, a measurement that is affected by the pair of qubits, and no measurement being determined to be affected by the pair of qubits. These embodiments of the computer program product can provide a number of advantages, including that the computer program product can reduce the number of gates utilized in a quantum circuit to run the application or associated algorithm, and reduce connectivity utilized in a quantum circuit to run the application or algorithm.

These and other features will become apparent from the following detailed description of illustrative embodiments thereof, which is to be read in connection with the accompanying drawings.

DETAILED DESCRIPTION

Figure 1:
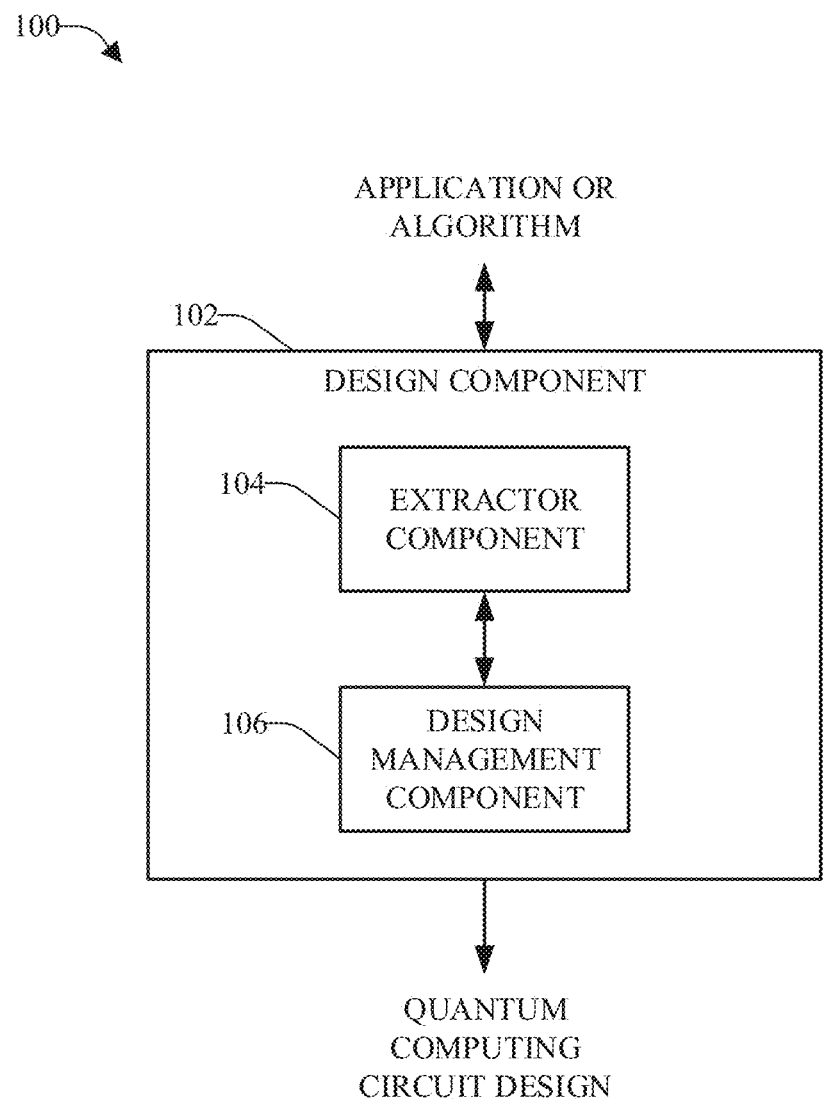
FIG. 1 illustrates a block diagram of an example, non-limiting system that can be utilized to efficiently design application or algorithm specific quantum computing circuit designs for applications or algorithms, in accordance with various aspects and embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Superconducting quantum computing circuit operations can rely on resonant coupler (e.g., "bus") connectivity or capacitive coupler connectivity to directly couple quantum bits (also referred to as qubits), which can be fixed in a quantum computing circuit design. A universal quantum computing circuit typically can have qubits that can be connected to all of their neighbor qubits, and typically can run virtually any type of algorithm. With regard to universal quantum computing circuits, for operations on quantum bits that have no direct connection, multiple swap gates typically can be used. Due to non-idealities, there can be a limit on the number of gate operations (e.g., a "shallow" quantum computing circuit) that can be employed during operation of the circuit.

The coherence time can characterize the amount of time that a qubit can remain in its quantum state, including an entangled state, before being influenced by its external environment. Currently, the coherence time can be relatively short, for instance, less than 500 microseconds (µs) in superconducting qubits. It can be difficult to extend the coherence time, which can result in a "shallow" quantum computing circuit, wherein the number of gate operations of the "shallow" quantum computing circuit can be limited.

There can be advantages of using quantum circuits even before quantum error correction and logical qubits with long effective coherence times can be achieved. Some applications, such as, for example, quantum dynamics, can employ a relatively sophisticated algorithm and/or can utilize a relatively significant amount of computing power when run on classical computers, which can make the use of classical computers undesirable and inefficient for such applications. Also, applications can comprise or utilize particular (e.g., specific) algorithms, wherein the algorithms can comprise or employ particular sequential gate operations, each on a subset of qubits when quantum circuits are employed. The use of quantum circuits typically can achieve better performance than classical computing when running such applications (e.g., applications, such as a quantum dynamics application, that employ sophisticated algorithms), even when quantum error correction and logical qubits with long effective coherence times have not yet been achieved.

In a superconducting quantum computing circuit, connectivity issues can be overcome by certain gate operations. For instance, in a superconducting quantum computing circuit, connectivity issues can be overcome by gate decomposition and the use of swap gates. Theoretically, any application or algorithm can be run on a universal quantum computing circuit. However, when running an application or algorithm on a universal quantum computing circuit, there can be costs or tradeoffs that can result in inefficiencies in the algorithm. These inefficiencies can negatively impact (e.g., reduce) performance of the application or algorithm using the universal quantum computing circuit. For example, when using a universal quantum computing circuit to run an application or algorithm, some of the costs and tradeoffs can include that there can be a relatively and unduly higher number of gate operations, which can be limited by the coherence time when using the universal quantum computing circuit. There can also be a relatively and unduly higher accumulative error rate, when using the universal quantum computing circuit to run an application or algorithm, since gate fidelity is not 100%. The higher number of qubits involved for an application or algorithm, the higher the costs or tradeoffs can be when using the universal quantum computing circuit to run an application or algorithm.

Figure 10:
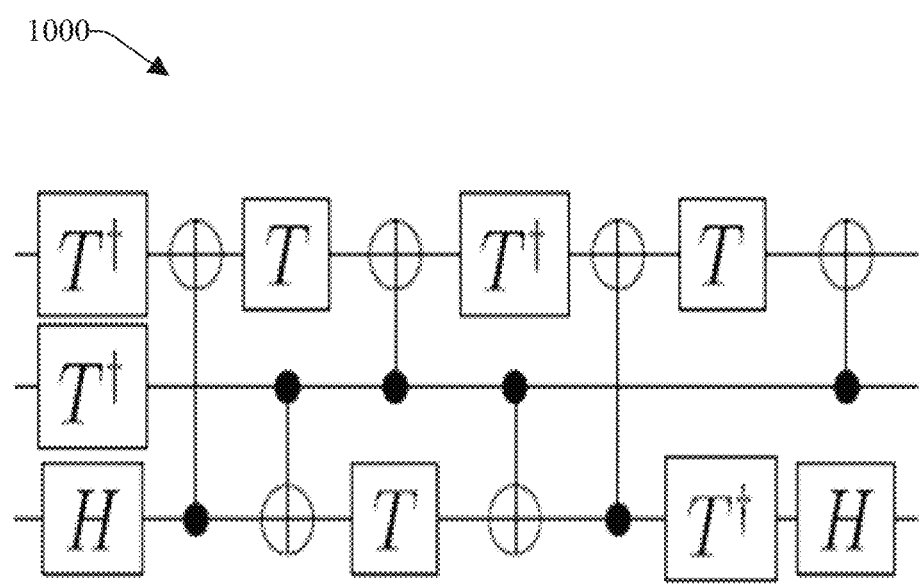
FIG. 10 presents a diagram or an example Toffoli gate of a quantum computing circuit.

The negative impact of using excessive gate operations has been illustrated with experimental results of comparing quantum computing circuit architectures, for example, in Linke, N. M. et al., Experimental comparison of two quantum computing architectures, Proc. Natl. Acad. Sci., Vol. 114, No. 13, 3305-3310 (2017). FIG. 10 presents a diagram of an example Toffoli gate 1000 of a quantum computing circuit. When a quantum computing circuit involves gates, such as the Toffoli gate 1000, between two disconnected pairs of qubits, there can be overhead due to using additional two-qubit gates to effect the swap operations utilized for, for example, a star-shaped circuit architecture. In the experimental comparison of two quantum computing architectures (Linke et al.), four algorithms were run on circuits comprising gates, such as the Toffoli gate 1000, using a star-shaped connectivity architecture with a superconducting hardware system and a fully connected connectivity architecture with an ion trap system, yielding certain experimental results as follows in Table 1:

TABLE 1

|  | Connectivity | | | | | |
| --- | --- | --- | --- | --- | --- | --- |
|  | Star Shaped | | | Fully connected | | |
|  | Hardware | | | | | |
|  | Superconducting | | | Ion trap | | |
| Success probability/% | Obs | Rand | Sys | Obs | Rand | Sys |
| Margolus | 74.1(7) | 82 | 75 | 90.1(2) | 91 | 81 |
| Toffoli | 52.6(8) | 78 | 59 | 85.0(2) | 89 | 78 |
| Bernstein-Vazirani | 72.8(5) | 80 | 74 | 85.1(1) | 90 | 77 |
| Hidden Shift | 35.1(6) | 75 | 52 | 77.1(2) | 86 | 57 | wherein TABLE 1 is a summary of success probabilities, represented as percentage values, for the circuits, wherein Obs represents observed probabilities, the first estimate assumes random (Rand) error propagation with overall error $(1-\epsilon_g)^{\sqrt{N}}$, and the second estimate is based on systematic (Sys) coherent over-rotations and under-rotations with overall error $(1-\epsilon_g)^N$, wherein N is the number of gates, and wherein $\epsilon_g$ is a gate error parameter.

Thus, traditional quantum computing circuits, such as universal quantum computing circuits, can be deficient to a number of problems, such as described above, including excessive or unnecessary connectivity between qubits, an unduly higher number of gate operations, which can be limited by the coherence time associated with qubits, and an unduly higher accumulative error rate, since gate fidelity is not 100%. The disclosed subject matter can be implemented to produce a solution to all or at least some of these problems and/or other problems with traditional quantum computing circuits in the form of determining and/or designing a custom (e.g., application or algorithm specific) quantum computing circuit (e.g., superconducting quantum computing circuit) for use with an application or algorithm. The disclosed subject matter, by determining and/or designing a custom quantum computing circuit for use with an application or algorithm, can, for example, reduce the number of gates utilized in a quantum computing circuit to run the application or algorithm, reduce connectivity utilized in a quantum computing circuit to run the application or algorithm, and enhance performance of the quantum computing circuit and the application or algorithm when running the application or algorithm using the quantum computing circuit.

To that end, the various embodiments herein relate to techniques for designing application or algorithm specific quantum computing circuits (e.g., superconducting quantum computing circuits). The disclosed subject matter can employ such techniques, for example, to engineer a physical layout scheme (e.g., a physical layout of a quantum computing circuit) for a particular application or algorithm, wherein the physical layout scheme can employ a reduced number of gates utilized on a quantum computing circuit to run the particular application or algorithm (e.g., as compared to a universal quantum computing circuit). The disclosed subject matter can generate an application or algorithm specific quantum computing circuit for the application or algorithm (e.g., quantum algorithm) that can achieve desirable (e.g., optimum, enhanced, suitable, or acceptable) performance of the application or algorithm, and accordingly, desirable performance of the quantum computing circuit (e.g., as compared to or over a universal quantum computing circuit).

The disclosed subject matter can comprise a design component that can be employed to design particular application or algorithm specific quantum computing circuits (e.g., custom or tailored quantum computing circuits) for particular applications or algorithms. The design component can comprise an extractor component that can extract pairs of qubits that are determined to satisfy a defined threshold potential of having to use a direct connection between each other (e.g., a direct connection between qubits within the qubit pair) in a quantum circuit design, according to the application or algorithm, based at least in part on the results of an analysis of an application or algorithm. The pairs of qubits can be, for example, qubit pairs for which a direct connection between qubits within a qubit pair can be desirable (e.g., particularly useful, beneficial, and/or preferred) with regard to the application or algorithm, in accordance with the application or algorithm, and defined circuit design criteria (and the associated defined threshold potential, which can be based at least in part on (e.g., indicated or specified by) the defined circuit design criteria). The design component also can include a design management component that can determine a circuit design of the quantum circuit to use for the application or algorithm based at least in part on the results of an analysis of characteristics associated with the pairs of qubits. As part of determining the quantum circuit design for the application or algorithm, the design management component can determine, for example, which of the pairs of qubits (e.g., extracted pairs of qubits) are to be assigned a direct connection within the qubit pair based at least in part on the results of the analysis of the characteristics associated with the pairs of qubits, and applicable processing and design constraints associated with the quantum circuit design, wherein such analysis can include, for example, applying a weighting scheme to the characteristics, and sorting and/or ranking the pairs of qubits in accordance with the weighting of the characteristics, as more fully described herein.

The design management component can sort the qubit pairs by weighting schemes and the characteristics associated with the pairs of qubits. The characteristics can comprise, for example, the number of affecting downstream qubits with respect to a pair of qubits of the pairs of qubits, the number of two-qubit gate operations between a pair of qubits, a measurement that can be affected by a pair of qubits, and/or a determination that there is no measurement that is to be affected by a pair of qubits. Based at least in part on the results of the sorting, the design management component can select a subset of the qubit pairs that are determined to be higher ranking pairs of qubits, in accordance with defined circuit design criteria that can relate to and/or be based at least in part on process and/or design specifications that can limit or indicate (e.g., indicate a defined threshold of) the maximum number of direct connections that can be assigned to qubit pairs. The design management component can assign a direct connection to those higher ranking pairs of qubits.

If the design management component determines or creates more than one circuit design that can satisfy defined circuit design criteria relating to the process and/or design specifications, and/or the application or algorithm, the design management component can analyze such circuit designs to determine the circuit design that is most suitable, as compared to the other circuit design(s), in accordance with applicable circuit design criteria (e.g., other circuit design criteria relating to determining the most suitable circuit design), as more fully described herein.

These and other aspects and embodiments of the disclosed subject matter will now be described with respect to the drawings.

FIG. 1 illustrates a block diagram of an example, non-limiting system 100 that can be utilized to efficiently design application or algorithm specific quantum computing circuit designs (e.g., superconducting quantum computing circuit designs) for applications or algorithms, in accordance with various aspects and embodiments of the disclosed subject matter. The system 100 can be utilized to design application or algorithm specific quantum computing circuits for particular applications or algorithms.

The system 100 can comprise a design component 102 that can be employed to design quantum computing circuits for applications or algorithms. The design component 102 can employ various techniques, as described herein, for designing application or algorithm specific quantum computing circuits for the applications or algorithms. The design component 102 can employ such techniques, for example, to engineer a physical layout scheme (e.g., a physical layout of a quantum computing circuit) for a particular application or algorithm, wherein the physical layout scheme can employ a reduced number of gates utilized in a quantum computing circuit to run (e.g., to more efficiently run) the particular application or algorithm (e.g., as compared to a universal quantum computing circuit). The design component 102 can generate an application or algorithm specific quantum computing circuit for the application or algorithm (e.g., quantum algorithm) that can achieve desirable (e.g., optimum, enhanced, suitable, or acceptable) performance of the application or algorithm, and accordingly, desirable performance of the quantum computing circuit (e.g., as compared to a universal quantum computing circuit).

The design component 102 can comprise an extractor component 104 and a design management component 106. The design management component 106 can analyze an application or algorithm. For instance, the design management component 106 can analyze characteristics, functions, and/or features of the application or algorithm. As part of the analysis of the application or algorithm, the design management component 106 can identify or determine qubits and/or pairs of qubits of the application or algorithm.

In some embodiments, the design management component 106 can determine, and the extractor component 104 can extract from the application or algorithm, pairs of qubits of the application or algorithm that satisfy a defined threshold potential of having to use a direct connection between each other (e.g., a direct connection between qubits within the qubit pair) in a quantum circuit design based at least in part on the results of the analysis of the application or algorithm, in accordance with defined circuit design criteria. The design management component 106 can determine a quantum computing circuit design to use for the application or algorithm based at least in part on the results of an analysis of characteristics associated with the pairs of qubits, in accordance with the defined circuit design criteria, as more fully described herein.

Figure 2:
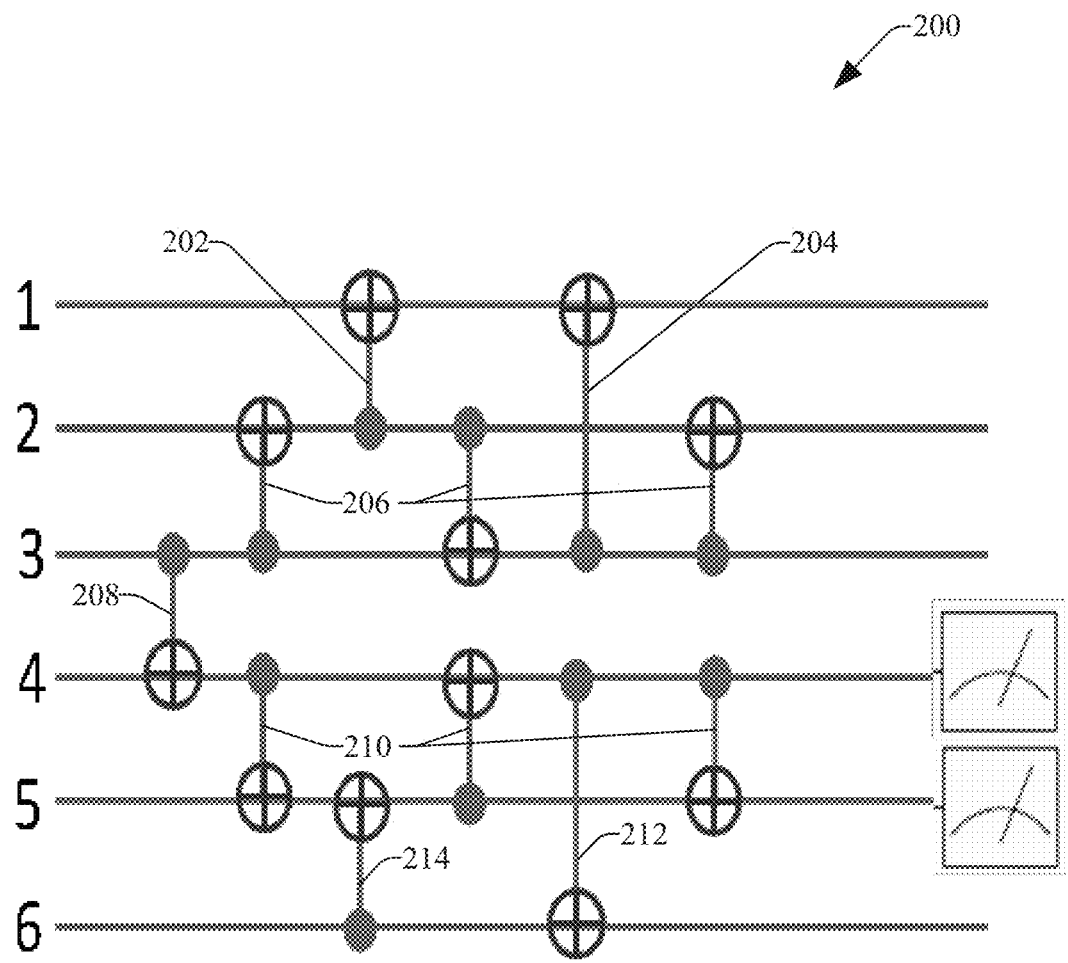
FIG. 2 depicts a diagram of an example, non-limiting algorithm for which a desirable custom quantum computing circuit design (e.g., an algorithm specific quantum computing circuit design) can be determined, in accordance with various aspects and embodiments of the disclosed subject matter.

Referring to FIG. 2 (along with FIG. 1), FIG. 2 depicts a diagram of an example, non-limiting algorithm 200 for which the design component 102 can determine a desirable custom quantum computing circuit design (e.g., an algorithm specific quantum computing circuit design), in accordance with various aspects and embodiments of the disclosed subject matter. For instance, based at least in part on the results of analyzing (e.g., by the design management component 106) of the algorithm 200 (e.g., the characteristics, functions, and/or features of the algorithm 200), the design management component 106 can determine pairs of qubits of the algorithm 200 that satisfy a defined threshold potential of having to use a direct connection between each other in a quantum circuit design, in accordance with defined circuit design criteria. For instance, based at least in part on the results of the analysis of the algorithm 200, the design management component 106 can identify or determine a set of qubit pairs of the algorithm 200 that satisfy the defined threshold potential of having to use a direct connection between each other in a quantum circuit design, wherein the set of qubit pairs can include, for example, qubit pair$_{12}$ 202, qubit pair$_{13}$ 204, qubit pair$_{23}$ 206, qubit pair$_{34}$ 208, qubit pair$_{45}$ 210, qubit pair$_{46}$ 212, and qubit pair$_{56}$ 214. As can be observed from the algorithm 200 in FIG. 2, the pairs of qubits in the set of qubit pairs (e.g., qubit pairs 202 through 214) at least potentially can utilize a direct connection.

The extractor component 104 can extract the pairs of qubits from the algorithm 200. The design management component 106 can determine a desirable (e.g., custom or tailored) quantum computing circuit design to use for the algorithm 200 (or application) based at least in part on the results of an analysis of characteristics (e.g., attributes) associated with the pairs of qubits in the set of qubit pairs (e.g., qubit pairs 202 through 214), in accordance with the defined circuit design criteria. To facilitate determining the desirable (e.g., custom or tailored) quantum computing circuit design for the algorithm 200, the design management component 106 can analyze the pairs of qubits of the set of qubit pairs (e.g., qubit pairs 202 through 214) of the algorithm 200 to identify or determine the characteristics associated with the pairs of qubits, and can analyze the characteristics associated with the pairs of qubits. For example, the design management component 106 can identify and analyze a first set of characteristics associated with a first pair of qubits, a second set of characteristics associated with a second pair of qubits, a third set of characteristics associated with a third pair of qubits, and so on. The characteristics can comprise, for example, a number of affecting downstream qubits associated with a pair of qubits of the pairs of qubits (e.g., qubit pairs 202 through 214), a number of two-qubit gate operations between a pair of qubits, a measurement that can be affected by a pair of qubits, and/or a determination that there is no measurement that is to be affected by a pair of qubits.

For example, based at least in part on the results of the analysis of the pairs of qubits, and the characteristics of the pairs of qubits, for the algorithm 200, the design management component 106 can determine that qubit pair$_{34}$ 208 has the most affecting downstream qubits as compared to the other qubit pairs (e.g., qubit pairs 202, 204, 206, 210, 212, and 214), as qubit pair$_{34}$ (being furthest left, and applied earliest in time, in the algorithm 200, when considering the qubit pairs from left to right in the algorithm 200) can affect all of the other qubits downstream, which is more than the number of qubits affected by any of the other qubit pairs. The design management component 106 also can determine that qubit pair$_{23}$ 206 and qubit pair$_{45}$ 210 each have the second highest number of affecting downstream qubits, as compared to the other qubit pairs.

As another example, the design management component 106 can determine that, for the algorithm 200, qubit pair$_{23}$ 206 and qubit pair$_{45}$ 210 have the highest number of two-qubit gate operations as compared to the other qubit pairs (e.g., qubit pairs 202, 204, 208, 212, and 214) of the set of qubit pairs. For instance, the design management component 106 can determine that qubit pair$_{23}$ 206 and qubit pair$_{45}$ 210 are called three times each for the algorithm 200, and can determine that this is more than the other qubit pairs of the set of qubits, and accordingly, can determine that qubit pair$_{23}$ 206 and qubit pair$_{45}$ 210 have the highest number of two-qubit gate operations as compared to the other qubit pairs of the set of qubit pairs.

The design management component 106 can sort the pairs of qubits of the set of qubit pairs (e.g., qubit pairs 202 through 214) based at least in part on the results of the analysis of the characteristics associated with the pairs of qubits of the set of qubits (e.g., 202 through 214) and weight values associated with (e.g., that can be assigned to or determined for) the characteristics associated with the pairs of qubits, in accordance with the defined circuit design criteria. The design management component 106 can determine and assign weights to the characteristics (e.g., the types of characteristics). For example, the design management component 106 can determine and assign a first weight to a first (e.g., a first type of) characteristic (e.g., a number of affecting downstream qubits associated with a pair of qubits) associated with pairs of qubits, a second weight to a second characteristic (e.g., a number of two-qubit gate operations between the pair of qubits) associated with pairs of qubits, and/or a third weight to a third characteristic (e.g., a measurement that can be affected by a pair of qubits, or a determination that no measurement will be affected by a pair of qubits) associated with pairs of qubits, and so on.

It is to be appreciated and understood that while certain characteristics, and a certain number of characteristics, associated with qubit pairs are disclosed herein, the disclosed subject matter is not so limited, as, in accordance with various embodiments of the disclosed subject matter, there can be other types of characteristics of the qubit pairs, in addition to or other than the characteristics disclosed herein, and/or there can be a desired number of qubit-pair characteristics considered that can be more than three, three, or less than three.

The design management component 106 can determine the ranking of the pairs of qubits of the set of pairs of qubits based at least in part on the results of the sorting of the pairs of qubits of the set of qubit pairs (e.g., qubit pairs 202 through 214), in accordance with the defined circuit design criteria. For example, with regard to the algorithm 200, if the design management component 106 determines that qubit pair$_{34}$ 208 has the highest weighted score of the qubit pairs of the set of qubit pairs, as compared to the weighted scores of the other qubit pairs (e.g., qubit pairs 202, 204, 206, 210, 212, and 214), the design management component 106 can determine that qubit pair$_{34}$ 208 is ranked highest, as compared to the rankings of the other qubit pairs (e.g., qubit pairs 202, 204, 206, 210, 212, and 214). If the design management component 106 determines that qubit pair$_{23}$ 206 and/or qubit pair$_{45}$ 210 have the second highest weighted score of the qubit pairs of the set of qubit pairs, as compared to the weighted scores of the other qubit pairs (e.g., qubit pairs 202, 204, 208, 212, and 214), the design management component 106 can determine that qubit pair$_{23}$ 206 and/or qubit pair$_{45}$ 210 is ranked second highest (or tied for second highest), as compared to the rankings of the other qubit pairs.

For instance, with regard to the algorithm 200, if the applicable circuit design criteria results in a weight value being assigned to the characteristic regarding the number of affecting downstream qubits associated with a pair of qubits that is sufficiently higher than the weight value assigned and applied to the characteristic regarding the number of two-qubit gate operations between the pair of qubits and the weight value assigned and applied to the characteristic regarding a measurement that can be affected by a pair of qubits (or a determination that no measurement will be affected by a pair of qubits), the weighted score of qubit pair$_{34}$ 208 can be higher than the weighted scores of qubit pair$_{23}$ 206 and qubit pair$_{45}$ 210 (and the other qubit pairs), even though qubit pair$_{23}$ 206 and qubit pair$_{45}$ 210 each have the second highest number of affecting downstream qubits and each have the highest number of two-qubit gate operations between the pair of qubits. If, however, with regard to the algorithm 200, the applicable circuit design criteria is different, and accordingly, the weight value being assigned to the characteristic regarding the number of affecting downstream qubits associated with a qubit pair that is not sufficiently higher than, or is lower than, the weight value assigned and applied to the characteristic regarding the number of two-qubit gate operations between a qubit pair and is not sufficiently higher than, or is lower than, the weight value assigned and applied to the characteristic regarding a measurement that can be affected by a qubit pair (or a determination that no measurement will be affected by a qubit pair), the weighted score of qubit pair$_{34}$ 208 can be lower than each of the weighted scores of qubit pair$_{23}$ 206 and qubit pair$_{45}$ 210, even though qubit pair$_{34}$ 208 has the highest number of affecting downstream qubits, which can result in the design management component 106 ranking qubit pair$_{23}$ 206 and qubit pair$_{45}$ 210 higher than qubit pair$_{34}$ 208.

Based at least in part on the rankings of the qubit pairs of the set of qubit pairs (e.g., qubit pairs 202 through 214), the design management component 106 can select a subset of pairs of qubits of the pairs of qubits that are determined to have a higher ranking as compared to other pairs of qubits of the set of qubit pairs (e.g., qubit pairs 202 through 214), in accordance with the defined circuit design criteria. With respect to the desirable (e.g., custom or tailored) quantum computing circuit design for the algorithm (e.g., algorithm 200) or application, the design management component 106 can assign a direct connection to each of the one or more pairs of qubits of the subset of pairs that are determined to have the higher ranking (e.g., higher weighted scores) than the other pairs of qubits of the set of qubits. The design management component 106 can determine the number (e.g., 1, 2, 3, or more) of pairs of qubits that can be in the subset of pairs of qubits based at least in part on defined circuit design criteria that can be related to process and/or design specifications that can limit or indicate (e.g., indicate a defined threshold of) the maximum number of direct connections that can be assigned to qubit pairs for the quantum computing circuit design for the algorithm (e.g., algorithm 200) or application.

Depending in part on the particular application or algorithm for which the quantum computing circuit is being designed, and/or the defined circuit design criteria, the number of pairs of qubits that can be in the subset of pairs of qubits can be at the maximum number of direct connections that can be assigned to qubit pairs or can be less than the maximum number of direct connections that can be assigned to qubit pairs. For example, if the applicable defined circuit design criteria relating to the applicable process and/or design specifications indicate or specify that the maximum number of qubit pairs that can have a direct connection in the desirable quantum computing circuit design is four, the design management component 106 can identify and select the four highest ranked pairs of qubits of the set of pairs of qubits to be in the subset of pairs of qubits, and can assign direct connections to those four highest ranked pairs of qubits that constitute the subset of pairs of qubits. In the desirable (e.g., custom or tailored) quantum computing circuit design for the application or algorithm (e.g., algorithm 200), the design management component 106 can determine other connections (e.g., non-direct connections) for the remaining pairs of qubits of the set of pairs of qubits that are not in the subset of pairs of qubits. For instance, the design management component 106 can determine single swap gate connections between qubits and/or two swap gate connections between qubits based at least in part on the characteristics and/or specifications of the application or algorithm (e.g., algorithm 200), in accordance with the defined circuit design criteria.

As another example, if the applicable circuit design criteria indicates relating to the applicable process and/or design specifications indicate or specify a maximum number of qubit pairs that can have a direct connection in the desirable quantum computing circuit design that is higher than the number of pairs of qubits in the set of pairs of qubits, the design management component 106 can determine that each qubit pair in the set of pairs of qubits can be assigned a direct connection in the desirable quantum computing circuit design. In such an instance, in response to determining that the number of extracted pairs of qubits is less than or equal to the maximum number of qubit pairs that can be assigned a direct connection in the quantum computing circuit design, the design management component 106 can bypass part of the analysis of the qubit pairs, can bypass the determining of the weighted scores for the qubit pairs, and/or can bypass the ranking of the qubit pairs (since all of the extracted qubit pairs can be assigned a direct connection).

In some instances, the design management component 106 can determine or create (e.g., generate) more than one desirable (e.g., custom or tailored) quantum computing circuit design with respect to a particular application or algorithm (e.g., algorithm 200) that can satisfy (e.g., match or meet or exceed) the defined circuit design criteria (e.g., initial or first stage circuit design criteria). In such instances, the design management component 106 can analyze such desirable quantum computing circuit designs. The design management component 106 can determine the quantum computing circuit design of those circuit designs that can be the most desirable (e.g., most enhanced, efficient, or suitable) circuit design, based at least in part on the results of such analysis, in accordance with applicable defined circuit design criteria. The applicable defined circuit design criteria can relate to, indicate, and/or specify, for example, which circuit design of multiple quantum computing circuit designs is to be considered the most desirable quantum computing circuit design. For example, the design management component 106 can analyze such quantum computing circuit designs, and can determine total numbers of gate operations (e.g., total numbers of single-qubit gate operations and/or two-qubit gate operations) of quantum computing circuit designs of such desirable quantum computing circuit designs based at least in part on the results of analyzing such desirable quantum computing circuit designs. In some embodiments, the design management component 106 can determine the quantum computing circuit design of such desirable quantum computing circuit designs that can have the lowest total number of gate operations (e.g., lowest total number of single-qubit gate operations and/or two-qubit gate operations) as compared to the other total number(s) of gate operations of the other quantum computing circuit design(s) of such quantum computing circuit designs. The design management component 106 can determine that the quantum computing circuit design, which is determined to have the lowest total number of gate operations, to be the most desirable quantum computing circuit design to employ with respect to the particular application or algorithm (e.g., algorithm 200), and can select that most desirable quantum computing circuit design to be employed with respect to the particular application or algorithm, in accordance with the (e.g., applicable) defined circuit design criteria.

It is to be appreciated and understood that, in accordance with various other embodiments, applicable design circuit criteria, which can relate to determining and selecting a (most) desirable (e.g., custom or tailored) quantum computing circuit design for an application or algorithm from multiple qualifying quantum computing circuit designs for the application or algorithm, can specify or indicate different design circuit criteria for determining and selecting a (most) desirable quantum computing circuit design, in addition to or as an alternative to design circuit criteria that specifies or indicates that the quantum computing circuit design having the lowest total number of gate operations is to be selected as the (most) desirable (e.g., custom or tailored) quantum computing circuit design for an application or algorithm.

With the desirable quantum computing circuit design determined, the design management component 106 can construct a schematic of the quantum computing circuitry layout for the desirable quantum computing circuit design. For instance, the design management component 106 can determine and construct a desirable (e.g., optimal, efficient, suitable, or acceptable) schematic of the quantum computing circuitry layout for the desirable quantum computing circuit design that can correspond to the characteristics of the qubits and qubit pairs, the connections (e.g., direct connections, single swap gate connections, or two swap gate connections) between qubits, etc. The design component 102 can present the schematic as an output and/or can employ the schematic to facilitate fabricating a desirable (e.g., custom or tailored) quantum computing circuit for the application or algorithm based at least in part on the schematic.

Figure 3:
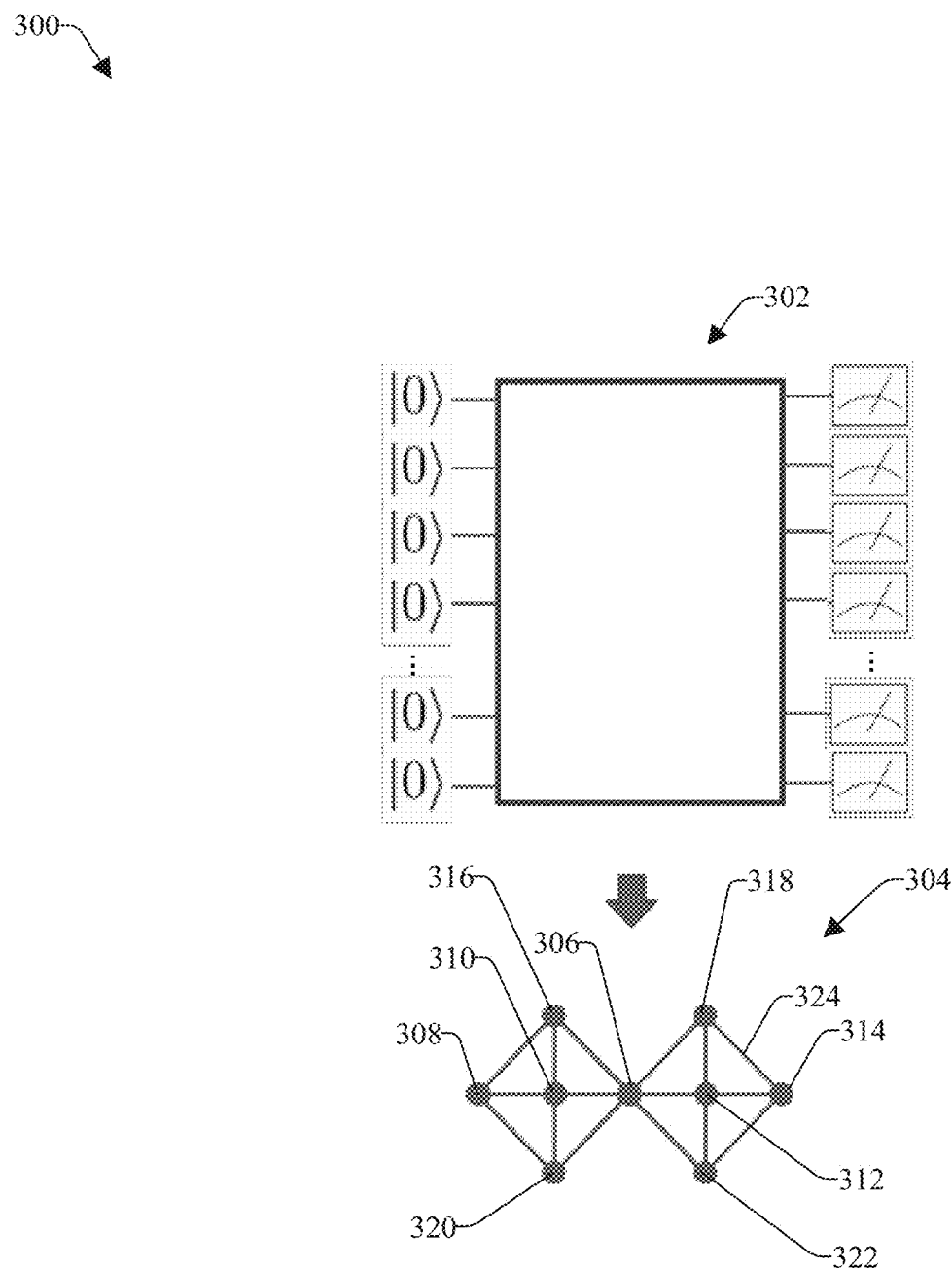
FIG. 3 presents a diagram of an example algorithm specific schematic generation for a desirable quantum computing circuit design for an example algorithm and constructing a corresponding schematic of the desirable quantum computing circuit design, in accordance with various aspects and embodiments of the disclosed subject matter.

With regard to other aspects and embodiments of the disclosed subject matter, the design component 102 can employ certain other techniques to facilitate determining a desirable (e.g., custom or tailored) quantum computing circuit design (e.g., an algorithm or application specific quantum computing circuit design) for an algorithm or application, in accordance with the defined circuit design criteria. Referring briefly to FIG. 3 (along with FIG. 1), FIG. 3 presents a diagram of an example algorithm specific schematic generation 300 for a desirable quantum computing circuit design for an example algorithm and constructing a corresponding schematic of the desirable quantum computing circuit design, in accordance with various aspects and embodiments of the disclosed subject matter. In the algorithm specific schematic generation 300, there can be an algorithm 302 for which a desirable (e.g., custom or tailored) quantum computing circuit design and corresponding schematic can be desired.

The design management component 106 can analyze the algorithm 302. For instance, the design management component 106 can analyze characteristics, functions, and/or features of the algorithm 302. Based at least in part on the results of the analysis of the characteristics, functions, and/or features of the algorithm 302, the design management component 106 can determine the number of qubits for a set of qubits to be utilized in the algorithm 302, and can determine the connectivity (e.g., quantum computing circuit connections) for each of the qubits of the set of qubits to be utilized in the algorithm 302, in accordance with the defined circuit design criteria.

In some embodiments, the design management component 106 can determine one or more qubits of the set of qubits that is or are the most connected qubit(s) (e.g., qubit(s) having the highest number or a relatively higher number of connections with other qubits), as compared to the connectivity of other qubits of the set of qubits, based at least in part on the results of the analysis of the characteristics, functions, and/or features of the algorithm 302. For instance, depending in part on the particular defined circuit design criteria that is applicable, the applicable circuit design criteria can indicate or specify that only the most connected qubit is to be considered, or the applicable circuit design criteria can indicate or specify that the two most connected qubits are to be considered, or the applicable circuit design criteria can indicate or specify that the three most connected qubits are to be considered, and so on. The design management component 106 can determine the configuration of the desirable (e.g., custom or tailored) quantum computing circuit design for the algorithm 302 based at least in part on the qubit(s) determined to be the most connected qubit(s) of the set of qubits. For example, the design management component 106 can determine the configuration of the desirable (e.g., custom or tailored) quantum computing circuit design for the algorithm 302, at least in part, to account for the connectivity(ies) of the qubit(s) determined to be the most connected qubit(s) of the set of qubits.

In certain embodiments, the design management component 106 can determine or decide whether certain qubits, such as, for example, ancilla qubits are to be utilized or not in the desirable quantum computing circuit design for the algorithm 302, based at least in part on the results of the analysis of the characteristics, functions, and/or features of the algorithm 302. If it is determined that one or more ancilla qubits are to be utilized in such design, the design management component 106 can determine whether there is to be a partial or full use of ancilla qubits in the desirable quantum computing circuit design for the algorithm 302.

The design management component 106 can determine the desirable quantum computing circuit design for the algorithm 302 based at least in part on the algorithm analysis results, the determination regarding the most connected qubit(s) of the set of qubits, the determinations or decisions regarding ancilla qubits, and/or other factors or determinations, in accordance with the defined circuit design criteria. The design management component 106 also can determine a schematic 304 of the quantum computing circuitry layout of the desirable quantum computing circuit design. For example, the design management component 106 can determine or generate an example schematic 304, which can comprise nine qubits (e.g., qubits 306, 308, 310, 312, 314, 316, 318, 320, and 322). The design management component 106 can determine and arrange the nine qubits in relation to each other, and can determine and arrange the connections between the qubits (e.g., qubits 306 through 322), such as, for example, connection 324 between qubits 314 and 318, in accordance with the desirable quantum computing circuit design.

It is to be appreciated and understood that the example schematic 304 of the quantum computing circuitry layout of the desirable quantum computing circuit design is merely one example of a schematic that can be determined or generated. In accordance with various embodiments, the design component 102, employing the design management component 106, can determine a different algorithm specific quantum computing circuit design and associated example schematic 304 for the same algorithm, and/or can determine particular (e.g., different) algorithm specific quantum computing circuit designs and associated example schematics for other algorithms.

With regard to other aspects and embodiments of the disclosed subject matter, in developing a desirable (e.g., custom or tailored) quantum computing circuit design for an application or algorithm, the disclosed subject matter (e.g., employing the design component 102) can operate to increase circuit depth for quantum computing circuits. For example, there can be an example algorithm, wherein it can be desired to entangle one qubit with as many other qubits as possible. However, there can be a constraint (e.g., a processing or design constraint) that only up to four qubits can be connected to one qubit. To facilitate increasing circuit depth, the design component 102 can work to determine a quantum computing circuit design for the algorithm that can have as many two-qubit gate operations between as many qubits as possible entangled with one qubit as a target in as few steps as possible, while complying with the constraint.

Figure 4:
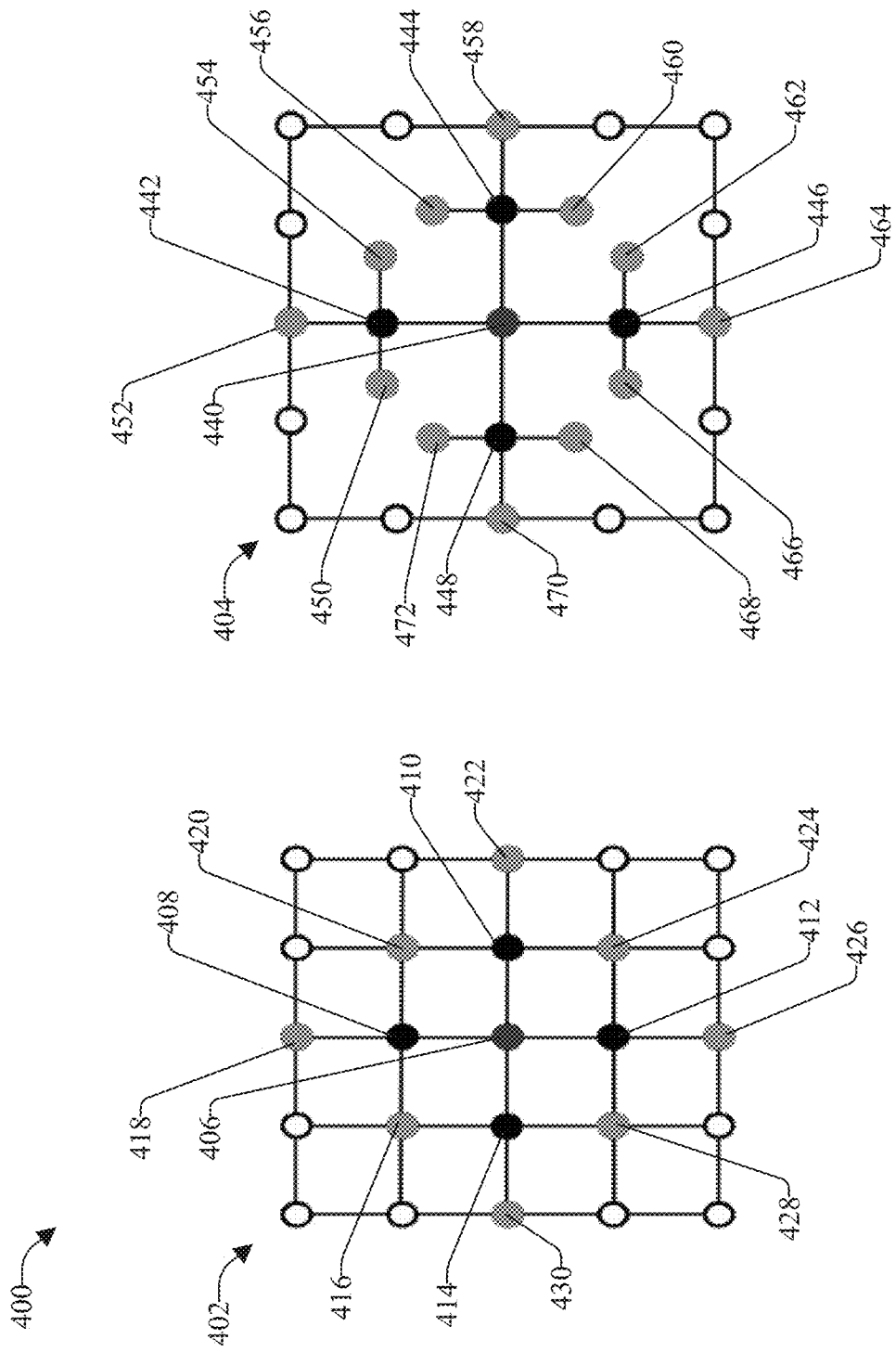
FIG. 4 presents a diagram of example quantum computing circuitry, in accordance with various aspects and embodiments of the disclosed subject matter.

Referring briefly to FIG. 4 (along with FIG. 1), FIG. 4 presents a diagram of example quantum computing circuitry 400, in accordance with various aspects and embodiments of the disclosed subject matter. The example quantum computing circuitry 400 can include a traditional square-array quantum computing circuit design 402 for an example algorithm. The example quantum computing circuitry 400 also can comprise an example customized quantum computing circuit design 404 (e.g., an algorithm or application specific quantum computing circuit design) for the example algorithm, wherein the customized quantum computing circuit design 404 can be designed by the design component 102 using the techniques described herein, in accordance with defined circuit design criteria.

As can be observed in FIG. 4, the traditional square-array quantum computing circuit design 402 can comprise various qubits, including qubit 406, which can be directly connected to four qubits, qubits 408, 410, 412, and 414, in accordance with the constraint. Due to the square-array layout of the quantum computing circuit design 402, those four qubits 408, 410, 412, and 414 each can be connected to three other qubits, wherein, for example, qubit 408 can be connected to qubits 416, 418, and 420, qubit 410 can be connected to qubits 420, 422, and 424, qubit 412 can be connected to qubits 424, 426, and 428, and qubit 414 can be connected to qubits 428, 430, and 416. Thus, there can be four direct connections (e.g., to the central qubit, qubit 406), and eight connections (e.g., to the central qubit, qubit 406) to entangle qubits with single swap gates. As can be observed, certain qubits (e.g., qubits 416, 420, 424, and 428) associated with single swap gates can be connected to multiple qubits (e.g., qubit 416 can be connected to qubits 408 and 414; qubit 420 can be connected to qubits 408 and 410; qubit 424 can be connected to qubits 410 and 412; and qubit 428 can be connected to qubits 412 and 414). As also can be observed, in the traditional square-array quantum computing circuit design 402, there can be twelve qubit pairs that can be entangled with the central qubit 406 after applying two swap gates.

With regard to the example customized quantum computing circuit design 404 for the example algorithm, the design component 102 can design the customized quantum computing circuit design 404 to comprise various qubits, including qubit 440, which also can be referred to as the central qubit of this customized quantum computing circuit design 404. In some embodiments, the design component 102, employing the techniques described herein, can remove or not include some connectivity of the circuitry (e.g., remove or not include unnecessary connectivity) to construct or configure the customized quantum computing circuit design 404 such that the customized quantum computing circuit design 404 can entangle more qubits with the central qubit 440 using a fewer number of gates, as compared to the traditional square-array quantum computing circuit design 402.

The design component 102 can directly connect qubit 440 to four qubits, qubits 442, 444, 446, and 448, in accordance with the constraint. The design component 102 can connect those four qubits 442, 444, 446, and 448 each to three other qubits, wherein, for example, qubit 442 can be connected to qubits 450, 452, and 454, qubit 444 can be connected to qubits 456, 458, and 460, qubit 446 can be connected to qubits 462, 464, and 466, and qubit 448 can be connected to qubits 468, 470, and 472. Thus, there can be four direct connections (e.g., to the central qubit, qubit 440), and twelve connections (e.g., to the central qubit, qubit 440) to entangle qubit pairs with single swap gates. As also can be observed, in the customized quantum computing circuit design 404, there can be up to thirty-six qubit pairs that can be entangled with the central qubit 440 after applying two swap gates.

Thus, as can be observed from the example customized quantum computing circuit design 404, as compared to the regular quantum computing circuit design 402, in particular, and more generally from customized (e.g., algorithm or application specific) quantum computing circuit designs that can be determined or created by the design component 102 for particular algorithms or applications, as compared to the regular quantum computing circuit designs that can be determined for algorithms or applications, even though the customized quantum computing circuit design (e.g., 404) and regular quantum computing circuit design (e.g., 402) each have the same number of qubits connected to a central qubit, the customized quantum computing circuit design (e.g., 404) can have a significantly higher number (e.g., twelve) of qubit pairs that can be entangled with a central qubit by applying single swap gates than the number (e.g., eight) of qubit pairs that can be entangled with a central qubit by applying single swap gates for the regular quantum computing circuit design (e.g., 402); and the customized quantum computing circuit design (e.g., 404) can have a significantly higher number (e.g., thirty-six) of two swap gates to entangle qubit pairs with a central qubit than the number (e.g., twelve) of two swap gates that can be utilized to entangle qubit pairs with a central qubit in the regular quantum computing circuit design (e.g., 402). The customized quantum computing circuit design (e.g., 404) also can reduce, remove, and/or otherwise not include undesirable (e.g., unnecessary) connectivity in the circuit design, as compared to the regular quantum computing circuit design (e.g., 402); and a customized quantum computing circuit design (e.g., 404) can be significantly more efficient than a regular quantum computing circuit design (e.g., 402), as the customized quantum computing circuit design can more efficiently and effectively use circuit area (e.g., can reduce area usage due in part to removing or not including undesirable connectivity) and/or can achieve enhanced (e.g., improved, better) performance for a specific algorithm, as compared to the regular quantum computing circuit design with regard to such specific algorithm.

It is to be appreciated that the system 100 can provide various advantages as compared to conventional techniques, such as using universal quantum computing circuit designs, for designing a quantum computing circuit for an application or associated algorithm. For instance, the system 100, which can extract pairs of qubits that can be determined to satisfy a defined threshold potential of having to use a direct connection between each other based at least in part on an analysis of an application or associated algorithm, and can determine a quantum computing circuit design to use for the application or associated algorithm based at least in part on the results of an analysis of characteristics associated with the pairs of qubits, advantageously can reduce the number of gates utilized in a quantum computing circuit to run an application or associated algorithm, reduce connectivity utilized in a quantum circuit to run the application or associated algorithm, enhance the usage of the area (e.g., reduce the amount of area used) for the quantum computing circuit design, and enhance performance of the quantum circuit and the application or associated algorithm when running the application or associated algorithm using the quantum circuit design, as compared to using a universal quantum computing circuit design to run the application or associated algorithm.

Figure 5:
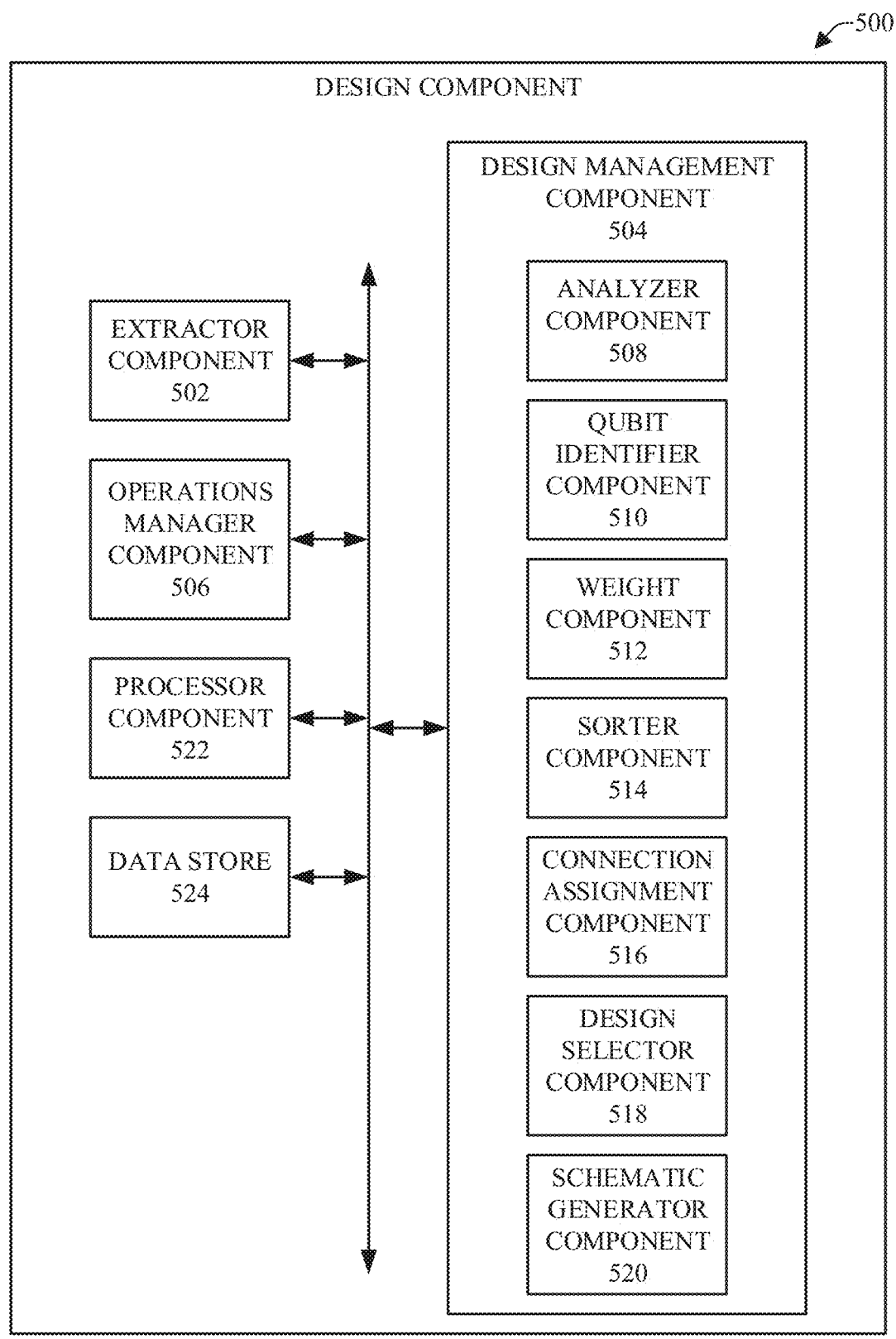
FIG. 5 illustrates a block diagram of an example design component, in accordance with various aspects and embodiments of the disclosed subject matter.

FIG. 5 illustrates a block diagram of an example design component 500, in accordance with various aspects and embodiments of the disclosed subject matter. The design component 500 can comprise an extractor component 502 and a design management component 504 that each can be the same as or similar to, and/or can comprise the same or similar functionality as, respective components (e.g., respectively named components), as more fully described herein.

The design component 500 can include an operations manager component 506 that can control (e.g., manage) operations associated with the design component 500. For example, the operations manager component 506 can facilitate generating instructions to have components of the design component 500 perform operations, and can communicate instructions to components (e.g., extractor component 502, the design management component 504 (or components thereof), processor component 522, data store 524, . . . ) of the design component 500 to facilitate performance of operations by the components of the design component 500 based at least in part on the instructions, in accordance with the defined circuit design criteria, defined circuit design algorithms (e.g., circuit design algorithms as disclosed, defined, recited, embodied or indicated herein by the methods, systems, and techniques described herein). The operations manager component 506 also can facilitate controlling data flow between the components of the design component 500 and controlling data flow between the design component 500 and another component(s) or device(s) (e.g., computer, laptop computer, or other type of computing and/or communication device) associated with (e.g., connected to) the design component 500.

The design management component 504 can comprise, for example, an analyzer component 508, a qubit identifier component 510, a weight component 512, a sorter component 514, a connection assignment component 516, a design selector component 518, and a schematic generator component 520. The analyzer component 508 can be employed to analyze information to facilitate determining desirable (e.g., custom or tailored) quantum computing circuit designs for algorithms or applications. For instance, the analyzer component 508 can analyze the characteristics, functions, and/or features of an algorithm or application (e.g., algorithm of an application).

Based at least in part on the results of the analysis of the characteristics, functions, and/or features of the algorithm or application, the qubit identifier component 510 can identify or determine qubits or pairs of qubits that are to be utilized for the algorithm or application. In some embodiments, based at least in part on the results of the analysis of the application or algorithm, the qubit identifier component 510 can identify or determine pairs of qubits (e.g., a set of pairs of qubits) of the algorithm or application that are determined satisfy the defined threshold potential of having to utilize a direct connection between each other in a quantum circuit design for the algorithm or application, in accordance with the defined circuit design criteria.

The extractor component 502 can extract the pairs of qubits from the algorithm or application. For example, the extractor component 502 can extract information relating to the pairs of qubits from the algorithm or application. In some embodiments, the analyzer component 508 can analyze the pairs of qubits to facilitate determining characteristics associated with the pairs of qubits. The qubit identifier component 510 can determine the characteristics associated with the pairs of qubits, based at least in part on the results of such analysis of the pairs of qubits. The characteristics can comprise, for example, a number of affecting downstream qubits associated with a pair of qubits of the pairs of qubits, a number of two-qubit gate operations between a pair of qubits, and a measurement that can be affected by a pair of qubits (or no measurement being affected by a pair of qubits).

The weight component 512 can determine and/or assign weights (e.g., weight values) to characteristics associated with the pairs of qubits. For instance, the weight component 512 can determine and/or assign a first weight to a first characteristic associated with pairs of qubits, a second weight to a second characteristic associated with pairs of qubits, and/or a third weight to a third characteristic associated with pairs of qubits, and so on, in accordance with the defined circuit design criteria. In some embodiments, the weight component 512 can determine (e.g., calculate) weighted scores relating to the characteristics associated with the pairs of qubits based at least in part on the results of analyzing the characteristics and the weights assigned to the characteristics.

The sorter component 514 can sort or rank the pairs of qubits based at least in part on the characteristics and the weights assigned to the characteristics. For example, the sorter component 514 can sort or rank the pairs of qubits based at least in part on the weighted scores associated with the pairs of qubits, wherein the sorter component 514 can determine the weighted scores associated with the pairs of qubits based at least in part on the characteristics associated with the pairs of qubits and the weights assigned to the characteristics.

The connection assignment component 516 can determine and/or assign connections to qubits and/or pairs of qubits, based at least in part on the results of analyzing qubits, pairs of qubits (e.g., the characteristics of the pairs of qubits), the sorting or ranking of the pairs of qubits, and/or other characteristics, functions, or features of the algorithm or application, in accordance with the defined circuit design criteria. The connections can comprise, for example, direct connections (e.g., a direct connection between a certain pair of qubits) or non-direct connections between qubits (e.g., single swap gates, or two swap gates). For instance, the connection assignment component 516 can determine and/or select a certain number of higher ranked pairs of qubits of the pairs of qubits, based at least in part on the rankings of the pairs of qubits of the set of qubit pairs and the defined number (e.g., maximum number) of pairs of qubits that can be assigned direct connections, in accordance with the applicable defined circuit design criteria (e.g., circuit design criteria relating to process and/or design limits for the quantum computing circuit). The connection assignment component 516 can assign direct connections to the higher ranked pairs of qubits to facilitate determining or generating the desirable quantum computing circuit design for the algorithm or application. The connection assignment component 516 also can determine and/or assign connections (e.g., non-direct connections) between other qubits (e.g., primary qubits and/or ancilla qubits) and/or qubit pairs, in accordance with the defined circuit design criteria, to facilitate determining or generating the desirable quantum computing circuit design for the algorithm or application.

In some instances, the design management component 504 can determine or create more than one desirable (e.g., custom or tailored) quantum computing circuit design with respect to a particular algorithm or application that can satisfy the defined circuit design criteria (e.g., initial or first stage circuit design criteria). In some embodiments, the design selector component 518 can determine and/or select the desirable (e.g., most desirable) quantum computing circuit design of the multiple desirable quantum computing circuit designs that can be the most desirable (e.g., most enhanced, efficient, or suitable) quantum computing circuit design, based at least in part on the results of analyzing the multiple desirable quantum computing circuit designs, in accordance with the defined circuit design criteria (e.g., other (e.g., second stage) applicable circuit design criteria relating to determining which of multiple desirable quantum computing circuit designs is the most desirable quantum computing circuit design). In some embodiments, the design selector component 518 can analyze the multiple desirable (e.g., at least potentially desirable) quantum computing circuit designs, and can determine total numbers of gate operations (e.g., total numbers of single-qubit gate operations and/or two-qubit gate operations) of the desirable quantum computing circuit designs based at least in part on the results of such analysis. The design selector component 518 can determine the quantum computing circuit design of the desirable quantum computing circuit designs that has the lowest total number of gate operations (e.g., lowest total number of single-qubit gate operations and/or two-qubit gate operations) as compared to the other total number(s) of gate operations of the other desirable quantum computing circuit design(s). The design selector component 518 can determine that the quantum computing circuit design, which is determined to have the lowest total number of gate operations, to be the most desirable quantum computing circuit design to employ with respect to the algorithm or application, and can select such most desirable quantum computing circuit design to be employed with respect to the algorithm or application, in accordance with the defined circuit design criteria (e.g., the applicable defined circuit design criteria).

The schematic generator component 520 can be employed to determine and/or construct a desirable quantum computing circuit layout for use with the algorithm or application, based at least in part on (e.g., corresponding to) the desirable (e.g., custom or tailored) quantum computing circuit design (e.g., the most desirable quantum computing circuit design). For instance, the schematic generator component 520 can determine and arrange qubits and/or qubit pairs in relation to each other in the quantum computing circuit layout, and can determine and arrange connections between the qubits and/or qubit pairs in the quantum computing circuit layout, in accordance with the desirable quantum computing circuit design for the algorithm or application.

The processor component 522 can work in conjunction with the other components (e.g., the extractor component 502, the design management component 504, operations manager component 506, and/or data store 524, . . . ) to facilitate performing the various functions of the design component 500. The processor component 522 can employ one or more processors, microprocessors, or controllers that can process data, such as information relating to algorithms or applications, qubits or qubit pairs, weights (e.g., weights to be assigned to characteristics associated with qubit pairs), defined circuit design criteria, defined circuit design algorithms, traffic flows, policies, protocols, interfaces, tools, and/or other information, to facilitate operation of the design component 500, as more fully disclosed herein, and control data flow between the design component 500 and other components (e.g., computer, laptop computer, or other computing or communication device) associated with (e.g., connected to) the design component 500.

The data store 524 can store data structures (e.g., user data, metadata), code structure(s) (e.g., modules, objects, hashes, classes, procedures) or instructions, information relating to algorithms or applications, qubits or qubit pairs, weights (e.g., weights to be assigned to characteristics associated with qubit pairs), defined circuit design criteria, defined circuit design algorithms, traffic flows, policies, protocols, interfaces, tools, and/or other information, to facilitate controlling operations associated with the design component 500. In an aspect, the processor component 522 can be functionally coupled (e.g., through a memory bus) to the data store 524 in order to store and retrieve information desired to operate and/or confer functionality, at least in part, to the extractor component 502, design management component 504, operations manager component 506, and/or data store 524, etc., and/or substantially any other operational aspects of the design component 500.

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 6:
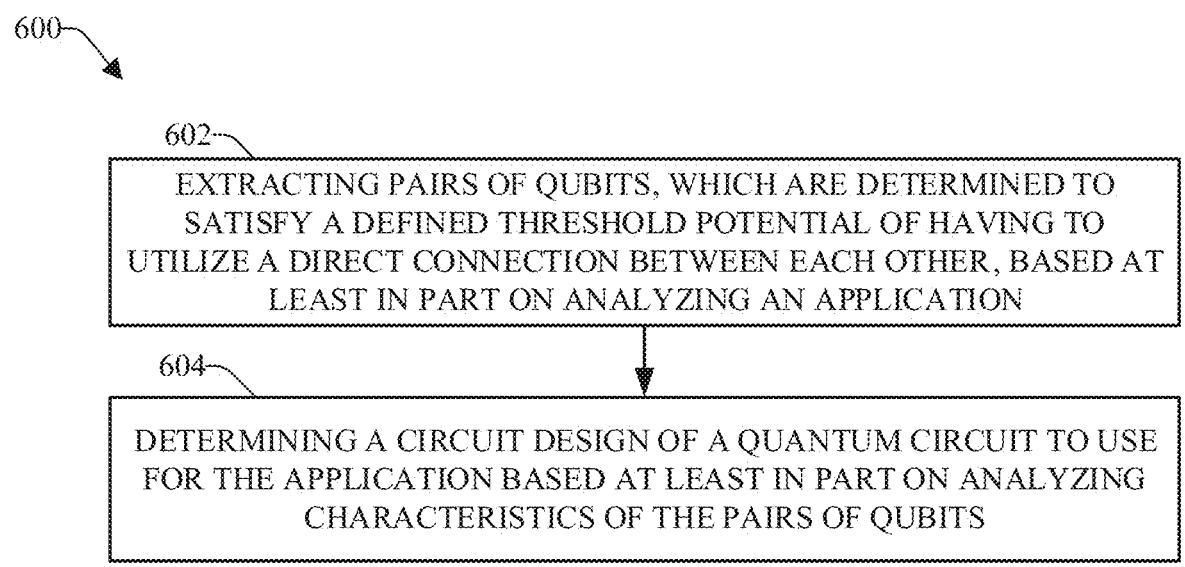
FIG. 6 illustrates a flow diagram of an example, non-limiting method for determining an application or algorithm specific quantum computing circuit design for an application or algorithm, in accordance with various aspects and embodiments of the disclosed subject matter.

FIG. 6 illustrates a flow diagram of an example, non-limiting method 600 for determining an application or algorithm specific quantum computing circuit design (e.g., superconducting quantum computing circuit design) for an application or algorithm, in accordance with various aspects and embodiments of the disclosed subject matter. The method 600 can be performed by, for example, a design component and/or a processor component. The design component can comprise an extractor component and a design management component. Repetitive description of like elements employed in other embodiments described herein is or may be omitted for sake of brevity.

At 602, pairs of qubits, which are determined to satisfy a defined threshold potential of having to utilize a direct connection between each other, can be extracted based at least in part on analyzing an application. The design management component can analyze the application (or an algorithm of or associated with the application). The design management component can identify qubits and pairs of qubits associated with the application (or associated algorithm) based at least in part on the results of the analysis of the application (or associated algorithm). Also, based at least in part on the results of such analysis, the design management component can determine pairs of qubits that satisfy the defined threshold potential of having to utilize a direct connection between each other (e.g., a direct connection between qubits within the qubit pair) in the quantum computing circuit design (e.g., custom or tailored quantum computing circuit design), in accordance with the defined circuit design criteria. The extractor component can extract the pairs of qubits to form a set of pairs of qubits.

At 604, a circuit design of a quantum circuit to use for the application can be determined based at least in part on analyzing characteristics of the pairs of qubits. The design management component can analyze the characteristics of the pairs of qubits in the set of pairs of qubits associated with the application (or associated algorithm). The design management component can determine the circuit design of the quantum circuit (e.g., the custom or tailored quantum computing circuit design) to use for the application (or associated algorithm) based at least in part on the results analyzing the characteristics of the pairs of qubits.

In accordance with various embodiments, to facilitate determining the circuit design, the design management component can assign weights (e.g., weight values) to the characteristics associated with the pairs of qubits, determine weighted scores for the pairs of qubits, sort and rank the pairs of qubits, and select a subset of the pairs of qubits to which direct connections can be assigned, in accordance with the defined circuit design criteria, as more fully described herein. If there is more than one quantum computing circuit design that can satisfy such defined circuit design criteria, the design management component can determine which of the multiple quantum computing circuit designs is the most desirable quantum computing circuit design, in accordance with defined circuit design criteria (e.g., other circuit design criteria relating to selecting the most desirable quantum computing circuit designs from multiple potential quantum computing circuit designs), as more fully described herein.

Figure 7:
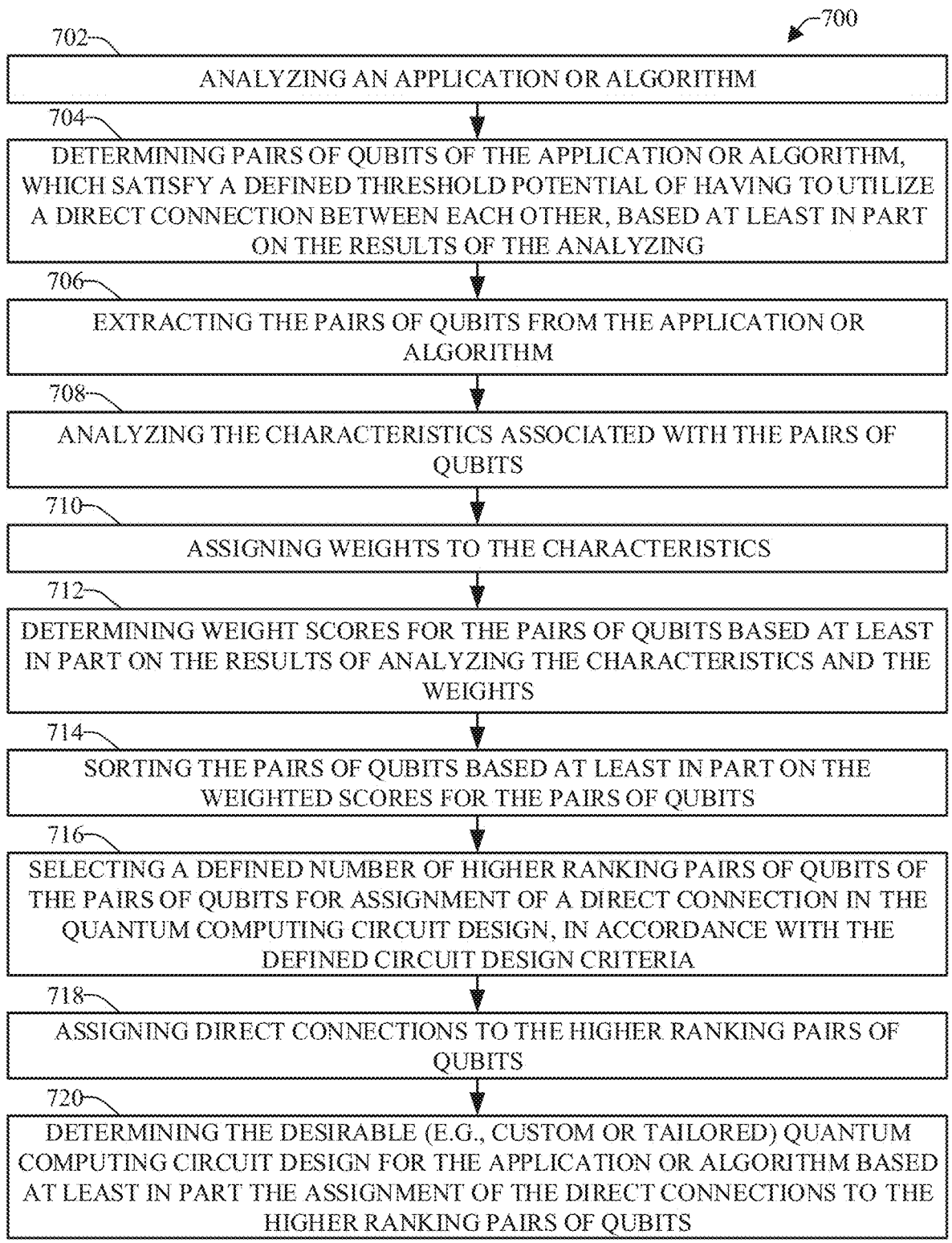
FIG. 7 depicts a flow diagram of another example, non-limiting method determining an application or algorithm specific quantum computing circuit design for an application or algorithm, in accordance with various aspects and embodiments of the disclosed subject matter.

FIG. 7 depicts a flow diagram of another example, non-limiting method 700 determining an application or algorithm specific quantum computing circuit design (e.g., superconducting quantum computing circuit design) for an application or algorithm, in accordance with various aspects and embodiments of the disclosed subject matter. The method 700 can be performed by, for example, a design component and/or a processor component. The design component can comprise an extractor component and a design management component. Repetitive description of like elements employed in other embodiments described herein is or may be omitted for sake of brevity.

At 702, an application or algorithm can be analyzed. The design management component can analyze the application or algorithm to facilitate determining or identifying qubits and pairs of qubits of the application or algorithm, determining or identifying pairs of qubits of the application or algorithm that satisfy a defined threshold potential of having to utilize a direct connection between each other (e.g., a direct connection between qubits within the qubit pair), and/or determining characteristics of the pairs of pairs of qubits (or qubits), etc.

At 704, pairs of qubits of the application or algorithm, which satisfy a defined threshold potential of having to utilize a direct connection between each other, can be determined based at least in part on the results of the analyzing of the application or algorithm. The design management component can determine pairs of qubits of the application or algorithm that satisfy the defined threshold potential of having to utilize a direct connection between each other, based at least in part on the results of the analyzing of the application or algorithm.

At 706, the pairs of qubits can be extracted from the application or algorithm. The extractor component can extract the pairs of qubits from the application or algorithm. For instance, the extractor component can extract information regarding the pairs of qubits from the application or algorithm.

At 708, the characteristics associated with the pairs of qubits can be analyzed. The design management component can analyze the characteristics associated with the pairs of qubits, for example, to facilitate identifying the characteristics associated with the pairs of qubits, and determining or identifying differences between the characteristics associated with the pairs of qubits. The characteristics associated with the pairs of qubits can comprise characteristics associated with the pairs of qubits, such as more fully described herein.

At 710, weights can be assigned to the characteristics. The design management component can assign the weights to the characteristics associated with the pairs of qubits, in accordance with the defined circuit design criteria. For example, in accordance with certain applicable circuit design criteria, the design management component can assign a first weight (e.g., first weight value) to a first characteristic associated with a qubit pair that can be higher than a second weight that can be assigned to a second characteristic associated with a qubit pair, which can be higher than a third weight that can be assigned to a third characteristic associated with a qubit pair, and so on.

At 712, weight scores for the pairs of qubits can be determined based at least in part on the results of analyzing the characteristics associated with the pairs of qubits and the weights. The design management component can determine (e.g., calculate) the weight scores for the pairs of qubits based at least in part on the results of analyzing the characteristics associated with the pairs of qubits and the weights assigned to the characteristics.

At 714, the pairs of qubits can be sorted based at least in part on the weighted scores for the pairs of qubits. The design management component can sort and/or rank the pairs of qubits based at least in part on the weighted scores for the pairs of qubits. For example, the design management component can sort and/or rank a first qubit pair of the pairs of qubits higher than a second qubit pair of the pairs of qubits, in response to the design management component determining that the first weighted score for the first qubit pair is higher than a second weighted score for the second qubit pair.

At 716, a defined number of higher ranking pairs of qubits of the pairs of qubits can be selected for assignment of a direct connection in the quantum computing circuit design, in accordance with the defined circuit design criteria. Defined circuit design criteria can specify or indicate a maximum number of pairs of qubits that can be assigned a direct connection in a quantum computing circuit design. The design management component can determine what the defined number of higher ranking pairs of qubits is based at least in part on the maximum number of pairs of qubits that can be assigned a direct connection in the quantum computing circuit design, wherein the defined number can be equal to, or up to, the maximum number. The design management component can select the defined number of higher ranking pairs of qubits of the pairs of qubits for assignment of a direct connection in the quantum computing circuit design.

At 718, direct connections can be assigned to the higher ranking pairs of qubits that are part of the defined number of higher ranking pairs of qubits. The design management component can assign direct connections to the higher ranking pairs of qubits that are part of the defined number of higher ranking pairs of qubits.

At 720, the desirable (e.g., custom or tailored) quantum computing circuit design for the application or algorithm can be determined based at least in part the assignment of the direct connections to the higher ranking pairs of qubits in the desirable quantum computing circuit design, in accordance with the defined circuit design criteria. The design management component can determine the desirable (e.g., custom or tailored) quantum computing circuit design for the application or algorithm based at least in part on the assignment of the direct connections to the higher ranking pairs of qubits in the desirable quantum computing circuit design. Based at least in part on such direct-connection assignments, the design management component can determine other connections (e.g., connections other than direct connections) between qubits or qubit pairs to complete the remaining connections (e.g., quantum circuit connections) to complete the construction or configuration of the desirable quantum computing circuit design. If there is more than one quantum computing circuit design that can satisfy the defined circuit design criteria, the design management component can determine which of the multiple quantum computing circuit designs is the most desirable quantum computing circuit design, in accordance with other circuit design criteria relating to selecting the most desirable quantum computing circuit designs from multiple potential quantum computing circuit designs, as more fully described herein.

Figure 8:
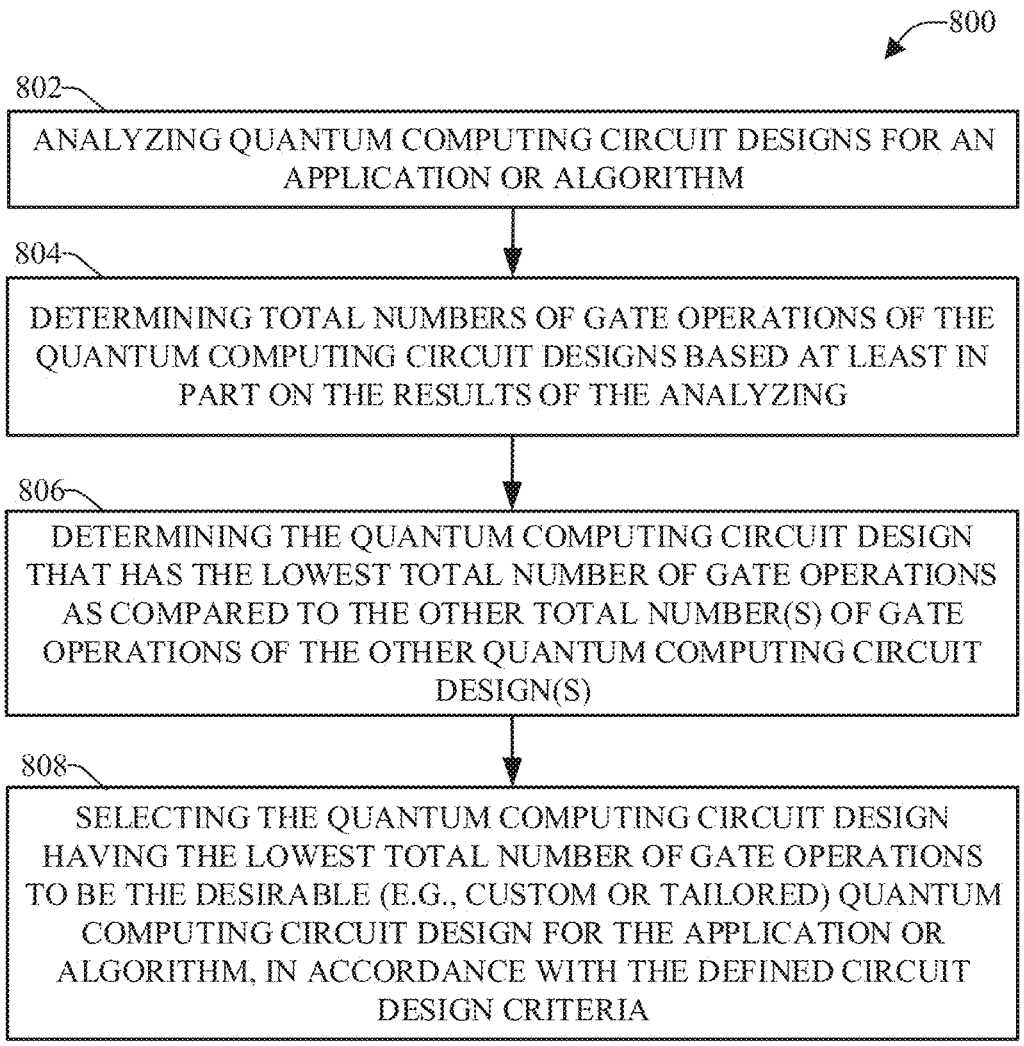
FIG. 8 presents a flow diagram of an example, non-limiting method determining which application or algorithm specific quantum computing circuit design for an application or algorithm of multiple application or algorithm specific quantum computing circuit designs for the application or algorithm is to be used for the application or algorithm, in accordance with various aspects and embodiments of the disclosed subject matter.

FIG. 8 presents a flow diagram of an example, non-limiting method 800 determining which application or algorithm specific quantum computing circuit design for an application or algorithm of multiple application or algorithm specific quantum computing circuit designs for the application or algorithm is to be used for the application or algorithm, in accordance with various aspects and embodiments of the disclosed subject matter. The method 800 can be performed by, for example, a design component and/or a processor component. The design component can comprise an extractor component and a design management component. Repetitive description of like elements employed in other embodiments described herein is or may be omitted for sake of brevity.

At 802, quantum computing circuit designs for an application or algorithm can be analyzed. In some instances, with regard to an application or algorithm, the design management component can determine multiple quantum computing circuit designs that can satisfy the defined circuit design criteria (e.g., initial or first stage circuit design criteria). The design management component can determine the quantum computing circuit designs for the application or algorithm by employing the various techniques described herein to determine desirable (e.g., custom or tailored) quantum computing circuit design for an application or algorithm (e.g., an application or algorithm specific quantum computing circuit design). The design management component can analyze the quantum computing circuit designs for the application or algorithm.

At 804, total numbers of gate operations of the quantum computing circuit designs can be determined based at least in part on the results of the analyzing. The design management component can determine (e.g., calculate) the total numbers of gate operations (e.g., total numbers of single-qubit gate operations and/or two-qubit gate operations) of the quantum computing circuit designs based at least in part on the results of the analyzing of the quantum computing circuit designs.

At 806, the quantum computing circuit design that has the lowest total number of gate operations as compared to the other total number(s) of gate operations of the other quantum computing circuit design(s) can be determined. The design management component can determine the quantum computing circuit design of the quantum computing circuit designs that has the lowest total number of gate operations (e.g., lowest total number of single-qubit gate operations and/or two-qubit gate operations) as compared to the other total number(s) of gate operations of the other quantum computing circuit design(s).

At 808, the quantum computing circuit design having the lowest total number of gate operations can be selected to be the desirable (e.g., custom or tailored) quantum computing circuit design for the application or algorithm, in accordance with the defined circuit design criteria. In some embodiments, the defined design circuit criteria can specify or indicate that, of the quantum computing circuit designs, the quantum computing circuit design having the lowest total number of gate operations is to be selected as the (most) desirable (e.g., custom or tailored) quantum computing circuit design for an application or algorithm. The design management component can select the quantum computing circuit design having the lowest total number of gate operations to be the (most) desirable (e.g., custom or tailored) quantum computing circuit design for the application or algorithm, in accordance with the defined circuit design criteria.

For simplicity of explanation, the methods and/or computer-implemented methods are depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts can be required to implement the computer-implemented methods in accordance with the disclosed subject matter. In addition, those skilled in the art will understand and appreciate that the computer-implemented methods could alternatively be represented as a series of interrelated states via a state diagram or events. Additionally, it should be further appreciated that the computer-implemented methods disclosed hereinafter and throughout this specification are capable of being stored on an article of manufacture to facilitate transporting and transferring such computer-implemented methods to computers. The term article of manufacture, as used herein, is intended to encompass a computer program accessible from any computer-readable device or storage media.

Figure 9:
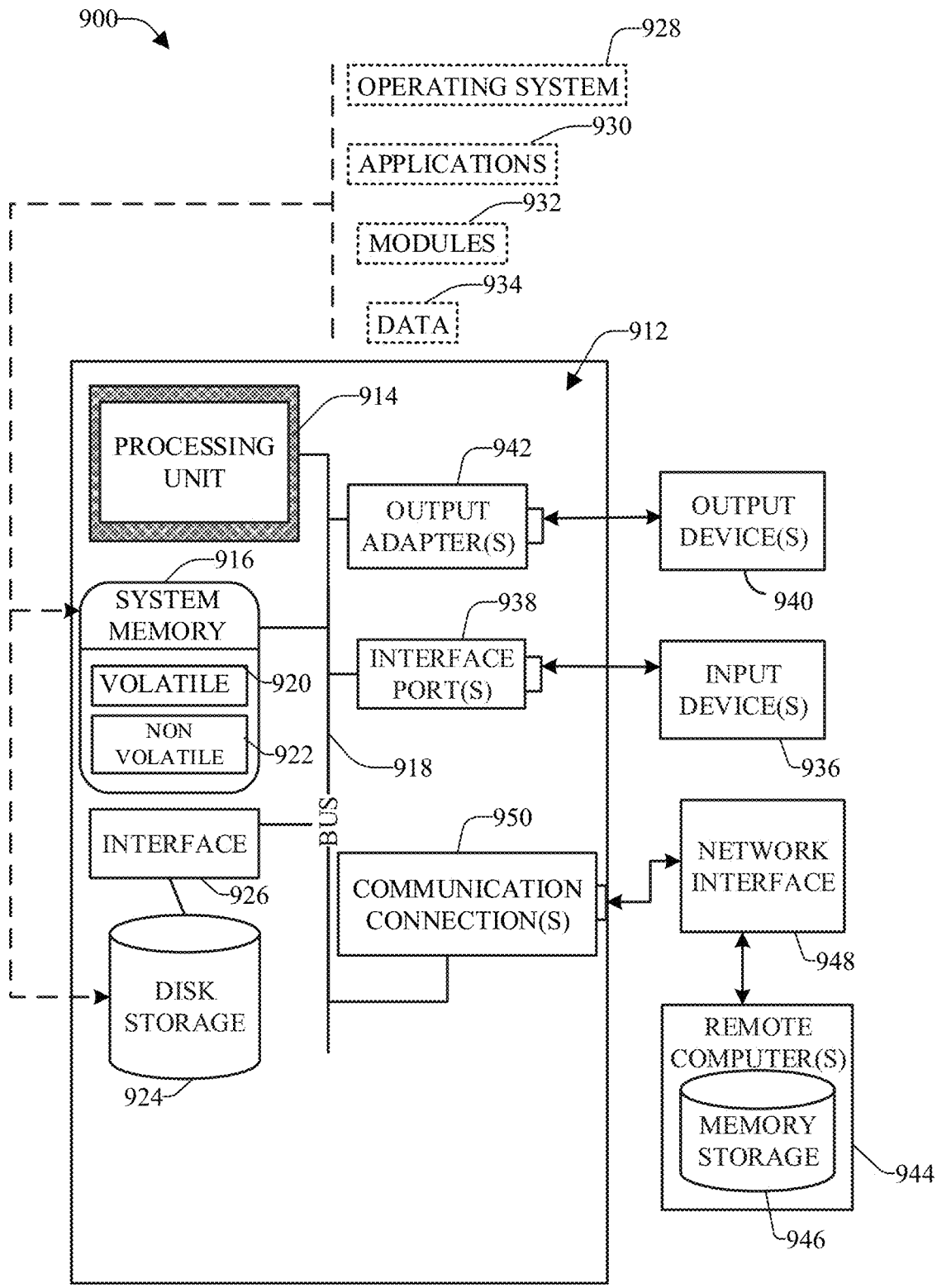
FIG. 9 illustrates a block diagram of an example, non-limiting operating environment in which one or more embodiments described herein can be facilitated.

In order to provide a context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated. Repetitive description of like elements employed in other embodiments described herein is or may be omitted for sake of brevity. With reference to FIG. 9, a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 916 can also include volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used, such as interface 926. FIG. 9 also depicts software that acts as an intermediary between users and the basic computer resources described in the suitable operating environment 900. Such software can also include, for example, an operating system 928. Operating system 928, which can be stored on disk storage 924, acts to control and allocate resources of the computer 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a method of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor based appliance, a peer device or other common network node and the like, and typically can also include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

One or more embodiments can be a system, a method, an apparatus and/or a computer program product at any possible technical detail level of integration. The computer program product can include a computer readable storage medium (or media) having computer readable program instructions thereon for causing a processor to carry out aspects of the one or more embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed subject matter.

Aspects of disclosed subject matter are described herein with reference to flowchart illustrations and/or block diagrams of methods, apparatus (systems), and computer program products according to embodiments of the subject disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer-executable components; and
   a processor, operatively coupled to the memory, that executes computer-executable components, the computer-executable components comprising:
   an extractor component that extracts pairs of qubits that are determined to satisfy a defined threshold potential of having to use a direct connection between each other based on an analysis of an application; and
   a design management component that determines a circuit design of a quantum circuit to use for the application based on an analysis of characteristics associated with the pairs of qubits, wherein the design management component sorts the pairs of qubits based on the characteristics associated with the pairs of qubits and weight values associated with the characteristics.

2. The system of claim 1, wherein the application is associated with a defined quantum algorithm from which the pairs of qubits are extracted.

3. The system of claim 1, wherein the characteristics are selected from a group of characteristics consisting of a number of affecting downstream qubits associated with a pair of qubits of the pairs of qubits, a number of two-qubit gate operations between the pair of qubits, a measurement that is affected by the pair of qubits, and no measurement being determined to be affected by the pair of qubits.

4. The system of claim 1, wherein the design management component further determines a subset of the pairs of qubits that have a higher ranking than other pairs of qubits of the pairs of qubits based on the sorting, and assigns direct connections to the pairs of qubits of the subset of the pairs of qubits based on a defined circuit design criterion that indicates a maximum number of pairs of qubits that are permitted to have a direct connection.

5. The system of claim 1, wherein the design management component determines that circuit designs, comprising the circuit design, satisfy a portion of defined circuit design criteria based on the analysis of the characteristics associated with the pairs of qubits.

6. The system of claim 5, wherein the design management component determines total numbers of single-qubit gate operations and two-qubit gate operations associated with the circuit designs, and determines that the circuit design is to be used for the quantum circuit based on a determination that the circuit design has a lowest number of two-qubit gate operations relative to other total numbers of two-qubit gate operations of other circuit designs of the circuit designs.

7. The system of claim 1, wherein the design management component determines a number of qubits to be used for the application to satisfy a defined circuit design criterion relating to specifications of a defined algorithm associated with the application, determines connectivity to be used for qubits of the qubits, and determines the circuit design based on the connectivity to be used for the qubits, in accordance with defined circuit design criteria, comprising the defined circuit design criterion.

8. The system of claim 7, wherein the design management component determines a subset of the qubits that satisfy a higher number of connections than other qubits of the qubits.

9. The system of claim 7, wherein the design management component determines one or more ancilla qubit characteristics that ancilla qubits of the qubits are to have based on the defined circuit design criteria.

10. The system of claim 1, wherein the design management component constructs a schematic of the circuit design.

11. The system of claim 1, wherein the program instructions are executable by the processor to cause the processor to further determine that circuit designs, comprising the circuit design, satisfy a portion of defined circuit design criteria based on the analysis of the characteristics associated with the pairs of qubits.

12. A computer-implemented method, comprising:
extracting, by a system operatively coupled to a processor, pairs of qubits that are determined to satisfy a defined threshold potential of having to utilize a direct connection between each other based on analyzing an application;
analyzing, by the system, characteristics associated with the pairs of qubits;
sorting, by the system, the pairs of qubits based on the characteristics associated with the pairs of qubits and weight values associated with the characteristics; and
determining, by the system, a circuit design of a quantum circuit to use for the application based on the analyzing the characteristics of the pairs of qubits.

13. The computer-implemented method of claim 12, wherein the characteristics are selected from a group of characteristics consisting of a number of affecting downstream qubits associated with a pair of qubits of the pairs of qubits, a number of two-qubit gate operations between the pair of qubits, a measurement that is affected by the pair of qubits, and no measurement being determined to be affected by the pair of qubits.

14. The computer-implemented method of claim 12, further comprising:
determining, by the system, a subset of the pairs of qubits that have a higher ranking than other pairs of qubits of the pairs of qubits based on the sorting of the pairs of qubits; and
assigning direct connections to pairs of qubits of the subset of the pairs of qubits, wherein a maximum number of pairs of qubits that is able to be in the subset of the pairs of qubits is determined based on a defined circuit design criterion.

15. The computer-implemented method of claim 12, further comprising:
determining, by the system, that circuit designs, comprising the circuit design, satisfy at least one defined circuit design criterion of defined circuit design criteria, based on the analyzing of the characteristics associated with the pairs of qubits.

16. The computer-implemented method of claim 15, further comprising:
determining, by the system, total numbers of single-qubit gate operations and two-qubit gate operations associated with the circuit designs;
determining, by the system, that the circuit design of the circuit designs has a lowest number of two-qubit gate operations as compared to other circuit designs of the circuit designs, based on comparing the total numbers of two-qubit gate operations; and
determining, by the system, that the circuit design is to be used for the quantum circuit based on the determining that the circuit design has the lowest number of two-qubit gate operations.

17. The computer-implemented method of claim 12, further comprising:
constructing, by the system, a schematic of the circuit design.

18. A computer program product that facilitates determining a circuit design of a quantum circuit, the computer program product comprising a computer readable storage medium having program instructions embodied therewith, the program instructions are executable by a processor to cause the processor to:
extract pairs of qubits that are determined to satisfy a defined threshold potential of having to use a direct connection between each other based on an analysis of an application; and
analyze characteristics associated with the pairs of qubits;
sort the pairs of qubits based on the characteristics associated with the pairs of qubits and weight values associated with the characteristics; and
determine the circuit design of the quantum circuit to use for the application based on the analysis and sort of the of characteristics of the pairs of qubits.

19. The computer program product of claim 18, wherein the characteristics are selected from a group of characteristics consisting of a number of affecting downstream qubits associated with a pair of qubits of the pairs of qubits, a number of two-qubit gate operations between the pair of qubits, a measurement that is affected by the pair of qubits, and no measurement being determined to be affected by the pair of qubits.

20. A system, comprising:
a memory that stores computer-executable components; and
a processor, operatively coupled to the memory, that executes computer-executable components, the computer-executable components comprising:
an extractor component that extracts pairs of qubits that are determined to meet a defined threshold potential for use of a direct connection between each other based on an analysis of an algorithm associated with an application; and
a design management component that determines a quantum computing circuit design to use for the algorithm based on an analysis of characteristics associated with the pairs of qubits, wherein the design management component sorts the pairs of qubits based on the characteristics associated with the pairs of qubits and weights associated with the characteristics.

21. The system of claim 20, wherein the characteristics are selected from a group of characteristics consisting of a number of affecting downstream qubits associated with a pair of qubits of the pairs of qubits, a number of two-qubit gate operations between the pair of qubits, a measurement that is affected by the pair of qubits, and no measurement being determined to be affected by the pair of qubits.

22. The system of claim 21, wherein the design management component determines a subset of the pairs of qubits that have a higher ranking than other pairs of qubits of the pairs of qubits based on the ranking, and assigns direct connections to the pairs of qubits of the subset of the pairs of qubits based on a defined circuit design criterion that indicates a defined number of pairs of qubits that are able to have a direct connection.

23. A computer program product that facilitates determining a quantum computing circuit design, the computer program product comprising a computer readable storage medium having program instructions embodied therewith, the program instructions are executable by a processor to cause the processor to:
- extract pairs of qubits that are determined to meet a defined threshold potential for use of a direct connection between each other based on an analysis of an algorithm associated with an application;
- analyze characteristics associated with the pairs of qubits;
- sort the pairs of qubits based on the characteristics associated with the pairs of qubits and weight values associated with the characteristics; and
- determine the quantum computing circuit design to use for the algorithm based on the analysis and sort of the characteristics associated with the pairs of qubits.

24. The computer program product of claim 23, wherein the characteristics are selected from a group of characteristics consisting of a number of affecting downstream qubits associated with a pair of qubits of the pairs of qubits, a number of two-qubit gate operations between the pair of qubits, a measurement that is affected by the pair of qubits, and no measurement being determined to be affected by the pair of qubits.

25. The computer program product of claim 23, wherein the program instructions are executable by the processor to cause the processor to further determine a subset of the pairs of qubits that have a higher ranking than other pairs of qubits of the pairs of qubits based on the sorting, and assign direct connections to the pairs of qubits of the subset of the pairs of qubits based on a defined circuit design criterion that indicates a maximum number of pairs of qubits that are permitted to have a direct connection.

* * * * *